US011958196B2

(12) United States Patent
Yamashita et al.

(10) Patent No.: US 11,958,196 B2
(45) Date of Patent: Apr. 16, 2024

(54) PRODUCTION SYSTEM AND INFORMATION STORAGE MEDIUM

(71) Applicant: Kabushiki Kaisha Yaskawa Denki, Kitakyushu (JP)

(72) Inventors: Takeshi Yamashita, Kitakyushu (JP); Ryosuke Tsutsumi, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 151 days.

(21) Appl. No.: 17/123,075

(22) Filed: Dec. 15, 2020

(65) Prior Publication Data

US 2021/0178589 A1 Jun. 17, 2021

(30) Foreign Application Priority Data

Dec. 17, 2019 (JP) ................................ 2019-227306

(51) Int. Cl.
*B25J 9/16* (2006.01)
*B25J 13/08* (2006.01)

(52) U.S. Cl.
CPC ............ *B25J 9/1664* (2013.01); *B25J 9/163* (2013.01); *B25J 9/1661* (2013.01); *B25J 13/089* (2013.01)

(58) Field of Classification Search
CPC ........ B25J 9/1664; B25J 9/163; B25J 9/1161; B25J 13/089; B25J 9/162; G05B 2219/39175; G05B 2219/40284; G05B 2219/40298; G05B 19/4185; G05B 2219/32252
See application file for complete search history.

(56) References Cited

U.S. PATENT DOCUMENTS 5,631,028 A * 5/1997 Mizokawa ......... B29D 30/0016 425/29
9,744,665 B1 * 8/2017 Linnell ...................... B25J 9/10
11,203,120 B1 * 12/2021 Hill ........................ B25J 9/0087
2010/0217437 A1 8/2010 Sarh et al.
2013/0245823 A1 9/2013 Kimura et al.
2014/0207280 A1 7/2014 Duffley et al.
2014/0207281 A1 7/2014 Angle et al.
2014/0207282 A1 7/2014 Angle et al.
(Continued)

FOREIGN PATENT DOCUMENTS

CN 103317497 A 9/2013
CN 105426257 A 3/2016
(Continued)

OTHER PUBLICATIONS

Search Report of May 18, 2021, for corresponding EP Patent Application No. 20213755.0 pp. 1-8.
(Continued)

*Primary Examiner* — Jason Holloway
*Assistant Examiner* — Blake A Wood
(74) *Attorney, Agent, or Firm* — HEA LAW PLLC

(57) ABSTRACT

A production system comprising: an industrial device being self-movable; and circuitry configured to; control the industrial device to prepare for a next job before the industrial device arrives at a next location; and control the industrial device to perform the next job when the industrial device arrives at the next location and a preparation for the next job is completed.

19 Claims, 13 Drawing Sheets

(56) References Cited

U.S. PATENT DOCUMENTS

| | | | | |
|---|---|---|---|---|
| 2014/0350725 | A1* | 11/2014 | LaFary | B25J 9/1676 901/50 |
| 2014/0365258 | A1* | 12/2014 | Vestal | G05D 1/0297 901/1 |
| 2016/0167234 | A1 | 6/2016 | Angle et al. | |
| 2016/0282862 | A1 | 9/2016 | Duffley et al. | |
| 2016/0282863 | A1 | 9/2016 | Angle et al. | |
| 2017/0015373 | A1 | 1/2017 | Thorwarth | |
| 2017/0015374 | A1 | 1/2017 | Thorwarth | |
| 2017/0185076 | A1 | 6/2017 | Yamamoto et al. | |
| 2018/0071918 | A1 | 3/2018 | Angle et al. | |
| 2018/0222047 | A1 | 8/2018 | Nishi | |
| 2018/0304472 | A1 | 10/2018 | Angle et al. | |
| 2019/0097827 | A1 | 3/2019 | Angle et al. | |
| 2019/0127000 | A1 | 5/2019 | Eberl | |
| 2019/0172488 | A1* | 6/2019 | Goodman | G11B 15/6835 |
| 2019/0370689 | A1 | 12/2019 | Ando et al. | |
| 2020/0298408 | A1* | 9/2020 | Hashimoto | B25J 9/1682 |
| 2021/0170601 | A1* | 6/2021 | Saito | B65G 1/0435 |
| 2022/0212346 | A1* | 7/2022 | Toritani | B25J 9/1661 |

FOREIGN PATENT DOCUMENTS

| | | | | |
|---|---|---|---|---|
| CN | 106103006 | A | 11/2016 | |
| CN | 107518826 | A | 12/2017 | |
| CN | 108873913 | A | 11/2018 | |
| CN | 109070291 | A | 12/2018 | |
| CN | 208775706 | U | 4/2019 | |
| CN | 109748203 | A | 5/2019 | |
| CN | 110235137 | A | 9/2019 | |
| CN | 110355759 | A | 10/2019 | |
| EP | 0704780 | A1 | 4/1996 | |
| EP | 2939798 | A1 | 11/2015 | |
| JP | H07-281721 | A | 10/1995 | |
| JP | H08-290350 | A | 11/1996 | |
| JP | 2005-238391 | A | 9/2005 | |
| JP | 2014-144490 | A | 8/2014 | |
| JP | 2017-132002 | A | 8/2017 | |
| WO | 2005/091090 | A2 | 9/2005 | |
| WO | WO-2010043640 | A2 * | 4/2010 | B25J 5/007 |

OTHER PUBLICATIONS

Office Actions of Mar. 17, 2020, for corresponding JP application No. 2019-227306 with the partial translation of the Office Action.

Office Actions of Aug. 11, 2020, for corresponding JP application No. 2019-227306 with he partial translation of the Office Action.

Office Action of Dec. 19, 2023, for corresponding CN Patent Application No. 202011417337.4 with translation, pp. 1-18.

* cited by examiner

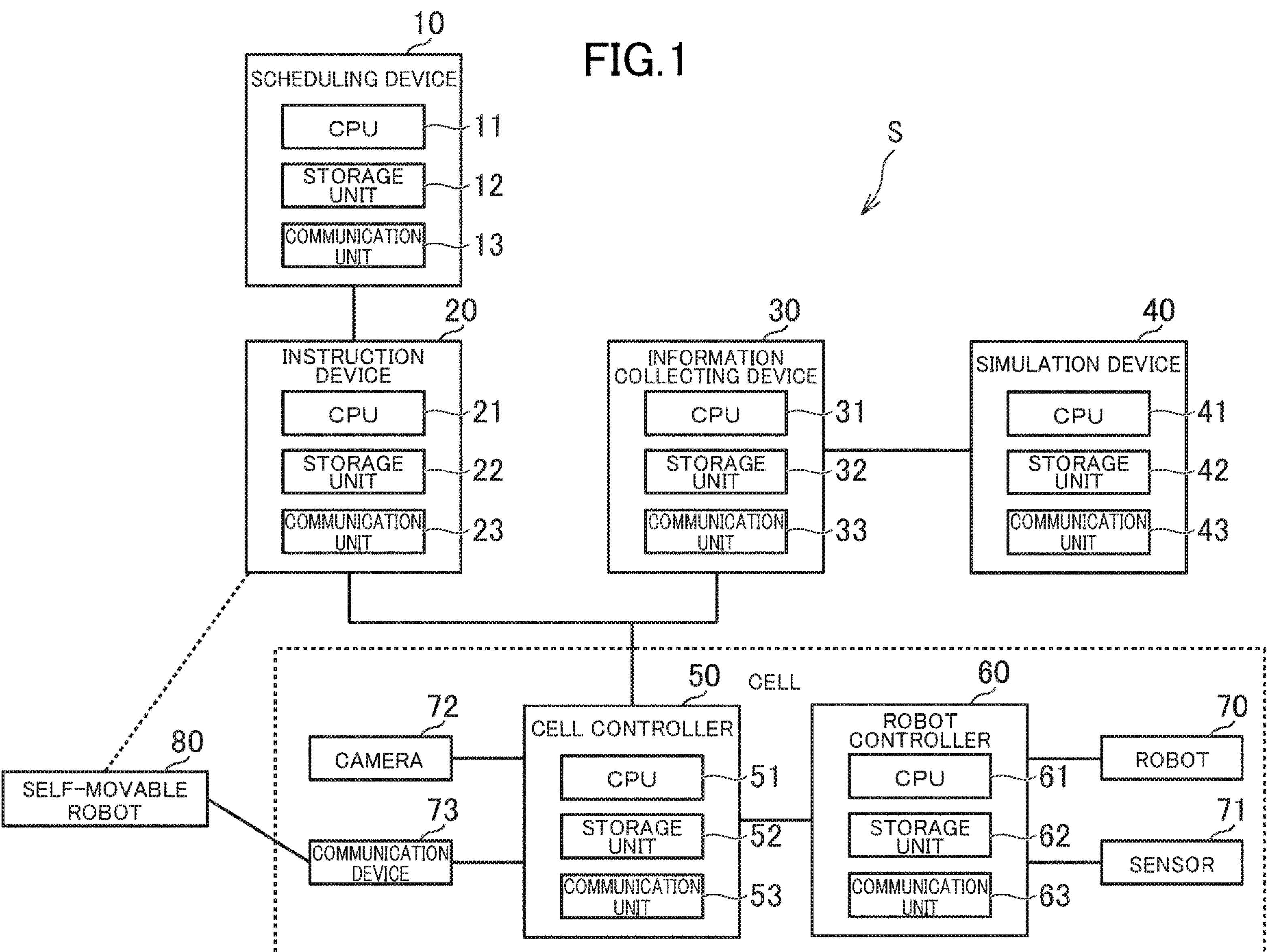
FIG.1
S
10
SCHEDULING DEVICE
CPU
11
STORAGE UNIT
12
COMMUNICATION UNIT
13
20
INSTRUCTION DEVICE
CPU
21
STORAGE UNIT
22
COMMUNICATION UNIT
23
30
INFORMATION COLLECTING DEVICE
CPU
31
STORAGE UNIT
32
COMMUNICATION UNIT
33
40
SIMULATION DEVICE
CPU
41
STORAGE UNIT
42
COMMUNICATION UNIT
43
CELL
50
CELL CONTROLLER
CPU
51
STORAGE UNIT
52
COMMUNICATION UNIT
53
60
ROBOT CONTROLLER
CPU
61
STORAGE UNIT
62
COMMUNICATION UNIT
63
70
ROBOT
71
SENSOR
72
CAMERA
73
COMMUNICATION DEVICE
80
SELF-MOVABLE ROBOT FIG.4
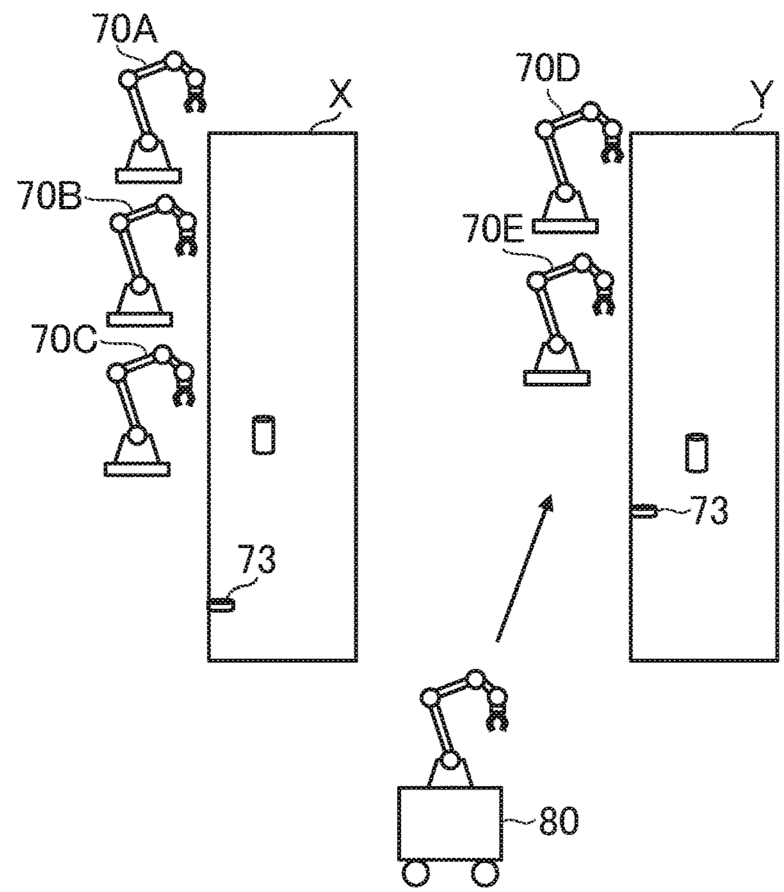
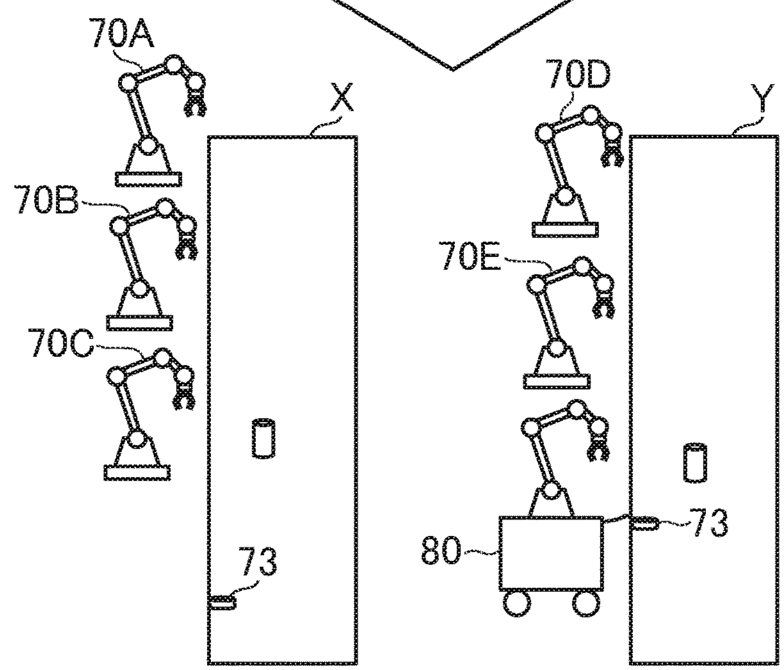

FIG.5
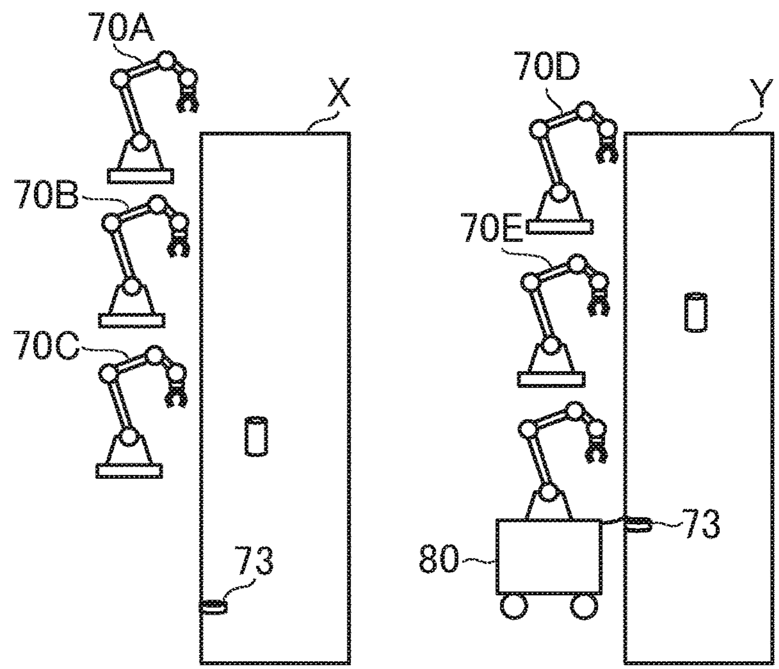
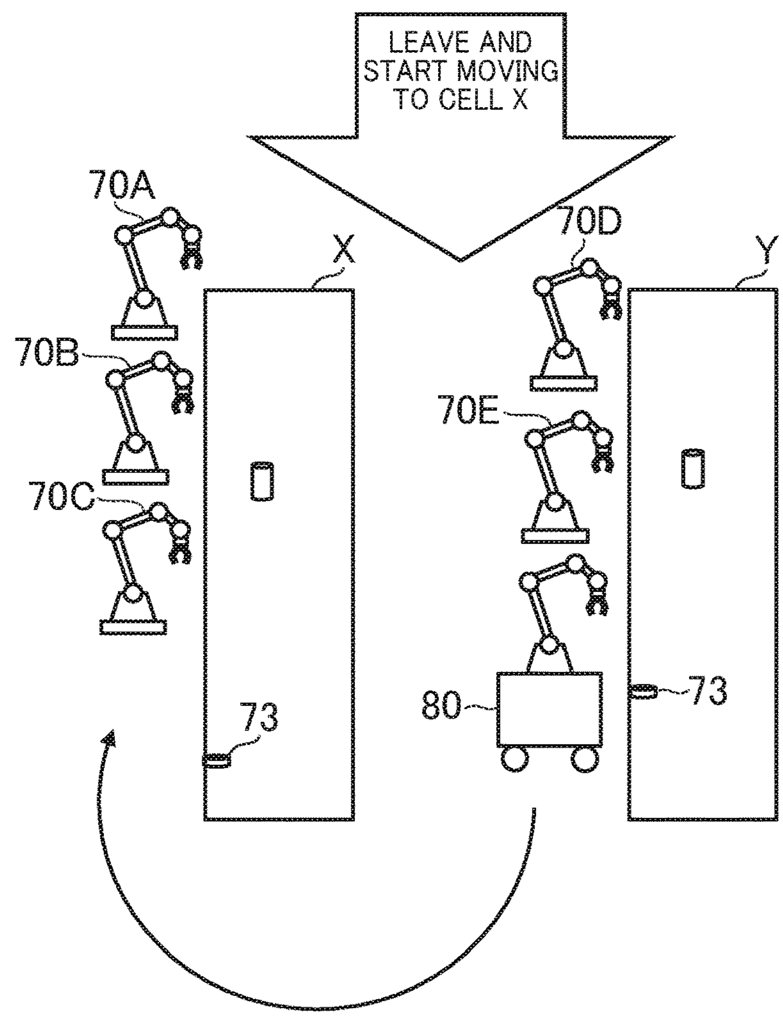

FIG.6
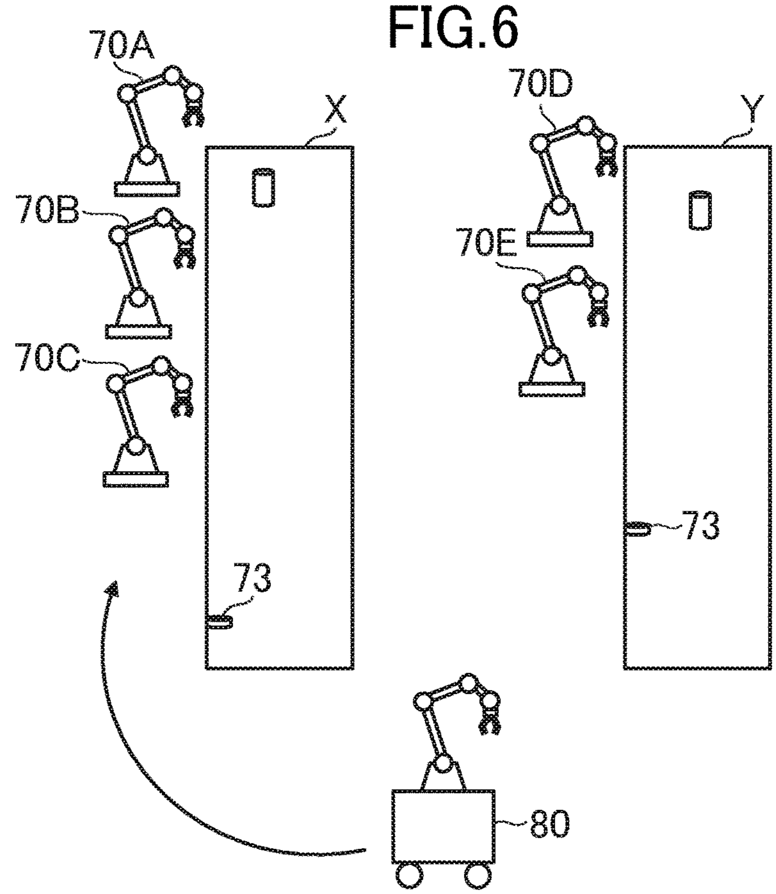
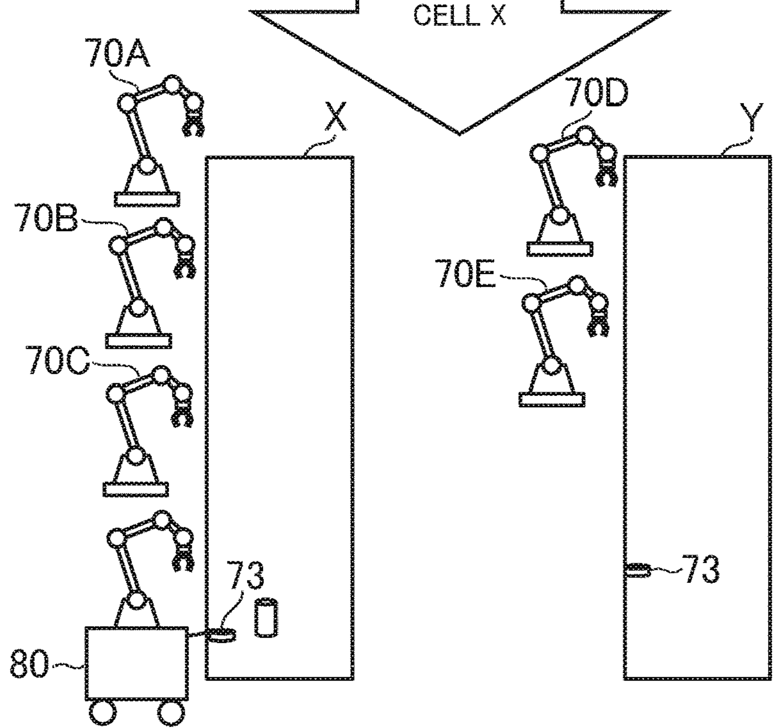

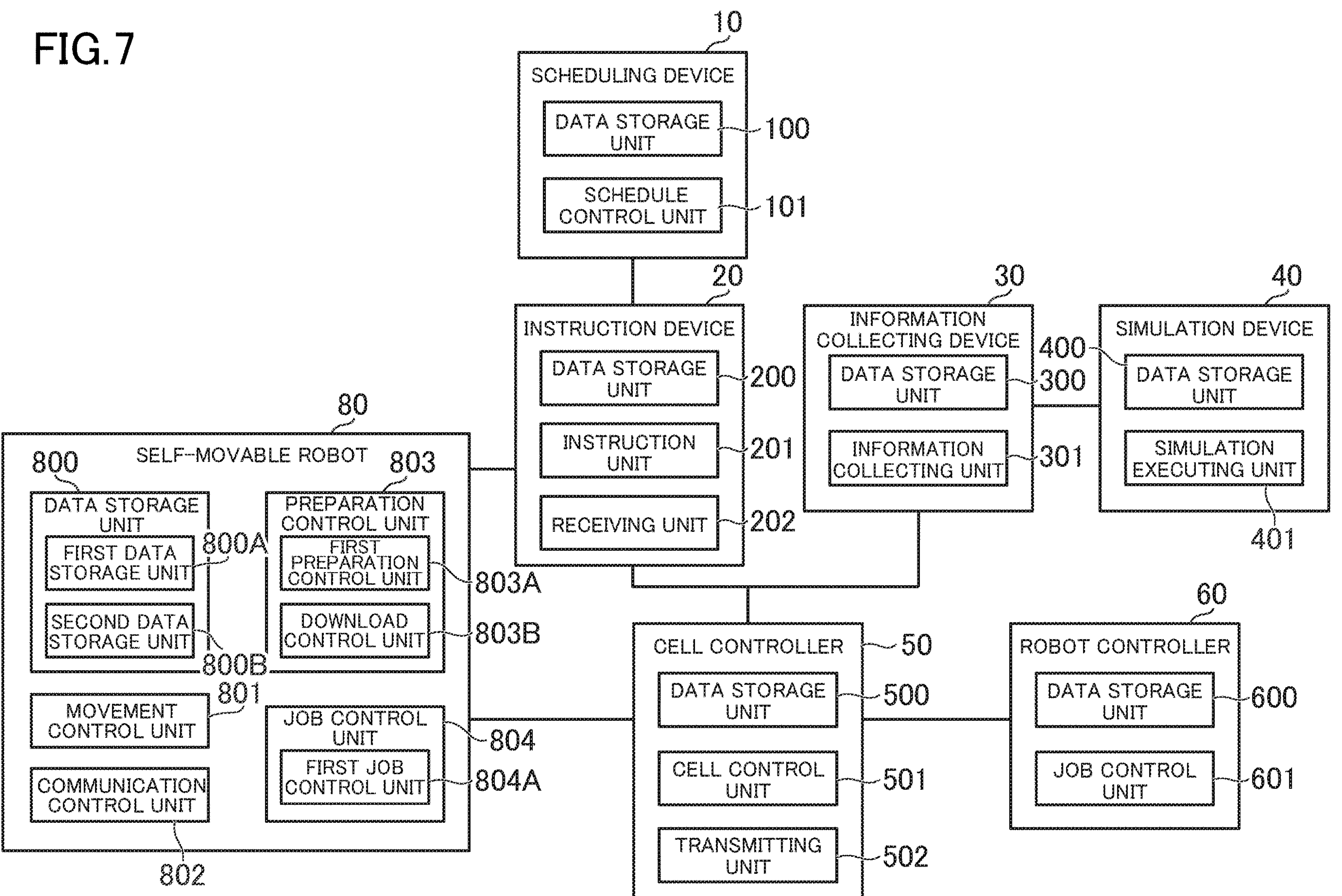
FIG.7
10
SCHEDULING DEVICE
DATA STORAGE UNIT
100
SCHEDULE CONTROL UNIT
101
20
INSTRUCTION DEVICE
DATA STORAGE UNIT
200
INSTRUCTION UNIT
201
RECEIVING UNIT
202
30
INFORMATION COLLECTING DEVICE
DATA STORAGE UNIT
300
INFORMATION COLLECTING UNIT
301
40
SIMULATION DEVICE
400
DATA STORAGE UNIT
SIMULATION EXECUTING UNIT
401
80
SELF-MOVABLE ROBOT
800
DATA STORAGE UNIT
FIRST DATA STORAGE UNIT
800A
SECOND DATA STORAGE UNIT
800B
803
PREPARATION CONTROL UNIT
FIRST PREPARATION CONTROL UNIT
803A
DOWNLOAD CONTROL UNIT
803B
MOVEMENT CONTROL UNIT
801
COMMUNICATION CONTROL UNIT
802
JOB CONTROL UNIT
804
FIRST JOB CONTROL UNIT
804A
CELL CONTROLLER
50
DATA STORAGE UNIT
500
CELL CONTROL UNIT
501
TRANSMITTING UNIT
502
60
ROBOT CONTROLLER
DATA STORAGE UNIT
600
JOB CONTROL UNIT
601

FIG.8

| JOB ORDER | JOB ID | CELL ID | INDUSTRIAL DEVICE ID | CONTENT OF JOB |
|---|---|---|---|---|
| 1 | p00001 | s00001 | i00001,u00002 | PRODUCE PRODUCT A |
| 2 | p00002 | s00002 | i00004,i00009··· | PROCESS JOBPIECE B |
| 3 | p00003 | s00004 | i00010 | PACK PRODUCT C |
| ⋮ | ⋮ | ⋮ | ⋮ | ⋮ |

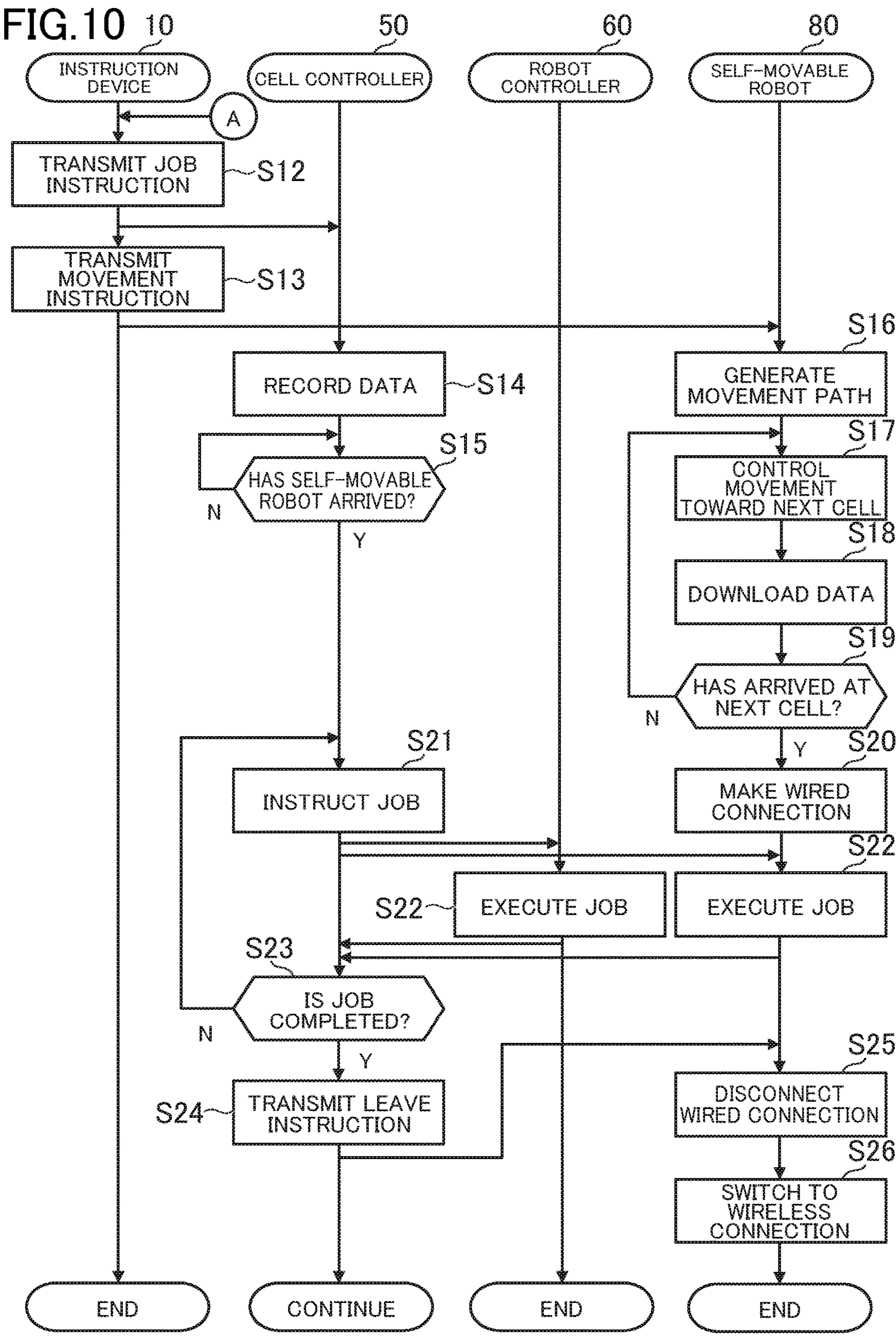
FIG.10
10
INSTRUCTION DEVICE
50
CELL CONTROLLER
60
ROBOT CONTROLLER
80
SELF-MOVABLE ROBOT
A
TRANSMIT JOB INSTRUCTION
S12
TRANSMIT MOVEMENT INSTRUCTION
S13
RECORD DATA
S14
HAS SELF-MOVABLE ROBOT ARRIVED?
S15
N
Y
S16
GENERATE MOVEMENT PATH
S17
CONTROL MOVEMENT TOWARD NEXT CELL
S18
DOWNLOAD DATA
S19
HAS ARRIVED AT NEXT CELL?
N
Y
S20
MAKE WIRED CONNECTION
S21
INSTRUCT JOB
S22
EXECUTE JOB
S22
EXECUTE JOB
S23
IS JOB COMPLETED?
N
Y
S24
TRANSMIT LEAVE INSTRUCTION
S25
DISCONNECT WIRED CONNECTION
S26
SWITCH TO WIRELESS CONNECTION
END
CONTINUE
END
END

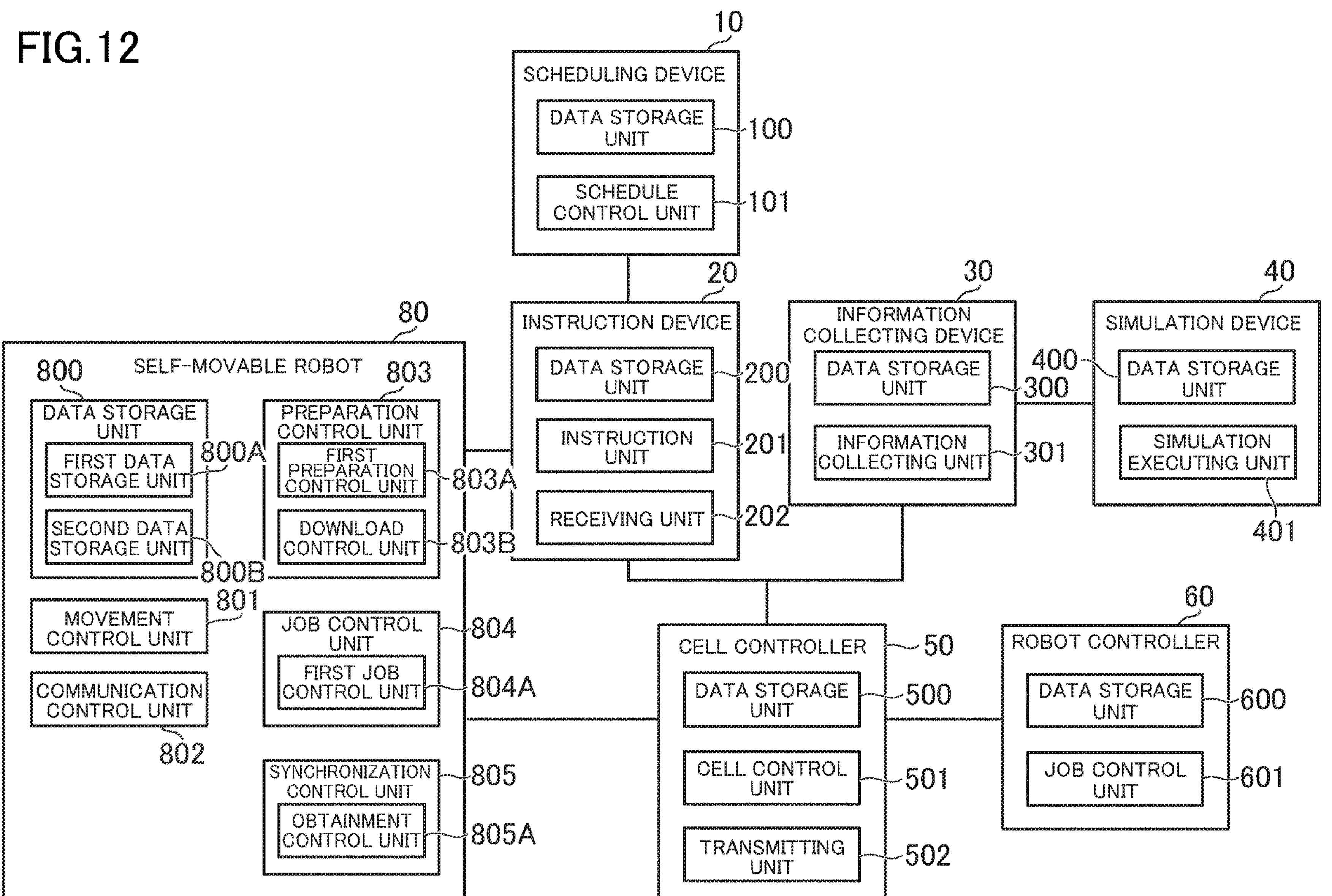
FIG.12
10
SCHEDULING DEVICE
DATA STORAGE UNIT
100
SCHEDULE CONTROL UNIT
101
20
INSTRUCTION DEVICE
DATA STORAGE UNIT
200
INSTRUCTION UNIT
201
RECEIVING UNIT
202
30
INFORMATION COLLECTING DEVICE
DATA STORAGE UNIT
300
INFORMATION COLLECTING UNIT
301
40
SIMULATION DEVICE
400
DATA STORAGE UNIT
SIMULATION EXECUTING UNIT
401
80
SELF-MOVABLE ROBOT
800
DATA STORAGE UNIT
FIRST DATA STORAGE UNIT
800A
SECOND DATA STORAGE UNIT
800B
803
PREPARATION CONTROL UNIT
FIRST PREPARATION CONTROL UNIT
803A
DOWNLOAD CONTROL UNIT
803B
MOVEMENT CONTROL UNIT
801
COMMUNICATION CONTROL UNIT
802
JOB CONTROL UNIT
804
FIRST JOB CONTROL UNIT
804A
SYNCHRONIZATION CONTROL UNIT
805
OBTAINMENT CONTROL UNIT
805A
CELL CONTROLLER
50
DATA STORAGE UNIT
500
CELL CONTROL UNIT
501
TRANSMITTING UNIT
502
60
ROBOT CONTROLLER
DATA STORAGE UNIT
600
JOB CONTROL UNIT
601

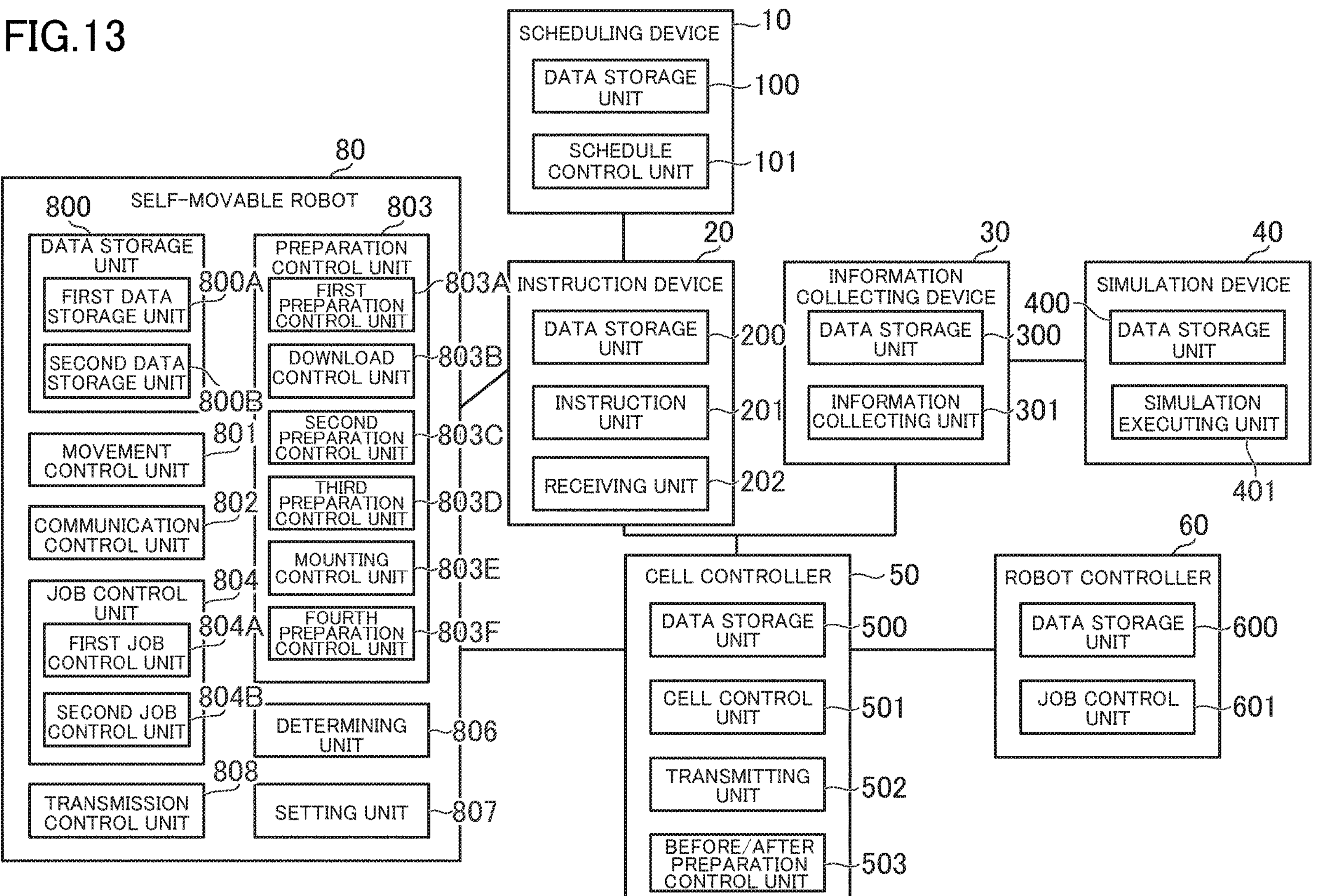
FIG.13
SCHEDULING DEVICE
10
DATA STORAGE UNIT
100
SCHEDULE CONTROL UNIT
101
80
SELF-MOVABLE ROBOT
800
DATA STORAGE UNIT
FIRST DATA STORAGE UNIT
800A
SECOND DATA STORAGE UNIT
800B
MOVEMENT CONTROL UNIT
801
COMMUNICATION CONTROL UNIT
802
JOB CONTROL UNIT
804
FIRST JOB CONTROL UNIT
804A
SECOND JOB CONTROL UNIT
804B
TRANSMISSION CONTROL UNIT
808
803
PREPARATION CONTROL UNIT
FIRST PREPARATION CONTROL UNIT
803A
DOWNLOAD CONTROL UNIT
803B
SECOND PREPARATION CONTROL UNIT
803C
THIRD PREPARATION CONTROL UNIT
803D
MOUNTING CONTROL UNIT
803E
FOURTH PREPARATION CONTROL UNIT
803F
DETERMINING UNIT
806
SETTING UNIT
807
20
INSTRUCTION DEVICE
DATA STORAGE UNIT
200
INSTRUCTION UNIT
201
RECEIVING UNIT
202
30
INFORMATION COLLECTING DEVICE
DATA STORAGE UNIT
300
INFORMATION COLLECTING UNIT
301
40
SIMULATION DEVICE
400
DATA STORAGE UNIT
SIMULATION EXECUTING UNIT
401
CELL CONTROLLER
50
DATA STORAGE UNIT
500
CELL CONTROL UNIT
501
TRANSMITTING UNIT
502
BEFORE/AFTER PREPARATION CONTROL UNIT
503
60
ROBOT CONTROLLER
DATA STORAGE UNIT
600
JOB CONTROL UNIT
601

PRODUCTION SYSTEM AND INFORMATION STORAGE MEDIUM

CROSS-REFERENCE TO RELATED APPLICATION

The present disclosure contains subject matter related to that disclosed in Japanese Patent Application JP2019-227306 filed in the Japan Patent Office on Dec. 17, 2019 the entire contents of which are hereby incorporated by reference.

BACKGROUND OF THE INVENTION

1. Field of the Invention

The embodiments disclosed herein relate to a production system and an information storage medium.

2. Description of the Related Art

JP2017-132002A describes a self-movable industrial device having a robot arm mounted on an automatic carrier, and a power accumulation part for accumulating power supplied through a connection part connected to/removed from a power supply source and supplying power to the robot arm.

SUMMARY OF THE INVENTION

A production system according to one aspect of the present invention includes an industrial device being self-movable; and circuitry configured to; control the industrial device to prepare for a next job before the industrial device arrives at a next location; and control the industrial device to perform the next job when the industrial device arrives at the next location and a preparation for the next job is completed.

BRIEF DESCRIPTION OF THE DRAWINGS

FIG. 1 is a diagram illustrating an example of an overall configuration of a production system according to embodiment 1.

FIG. 4 is a diagram illustrating an example of a cell in a production system.

FIG. 5 is a diagram illustrating an example of a cell in a production system.

FIG. 6 is a diagram illustrating an example of a cell in a production system.

FIG. 7 is a functional block diagram showing functions implemented in the production system.

FIG. 8 is a diagram illustrating an example of data storage of schedule data.

FIG. 10 is a flow chart showing processing executed in the production system.

FIG. 12 is a functional block diagram of embodiment 2.

FIG. 13 is a functional block diagram of a modification example.

DESCRIPTION OF THE EMBODIMENTS

1. Embodiment 1

Figure 2:
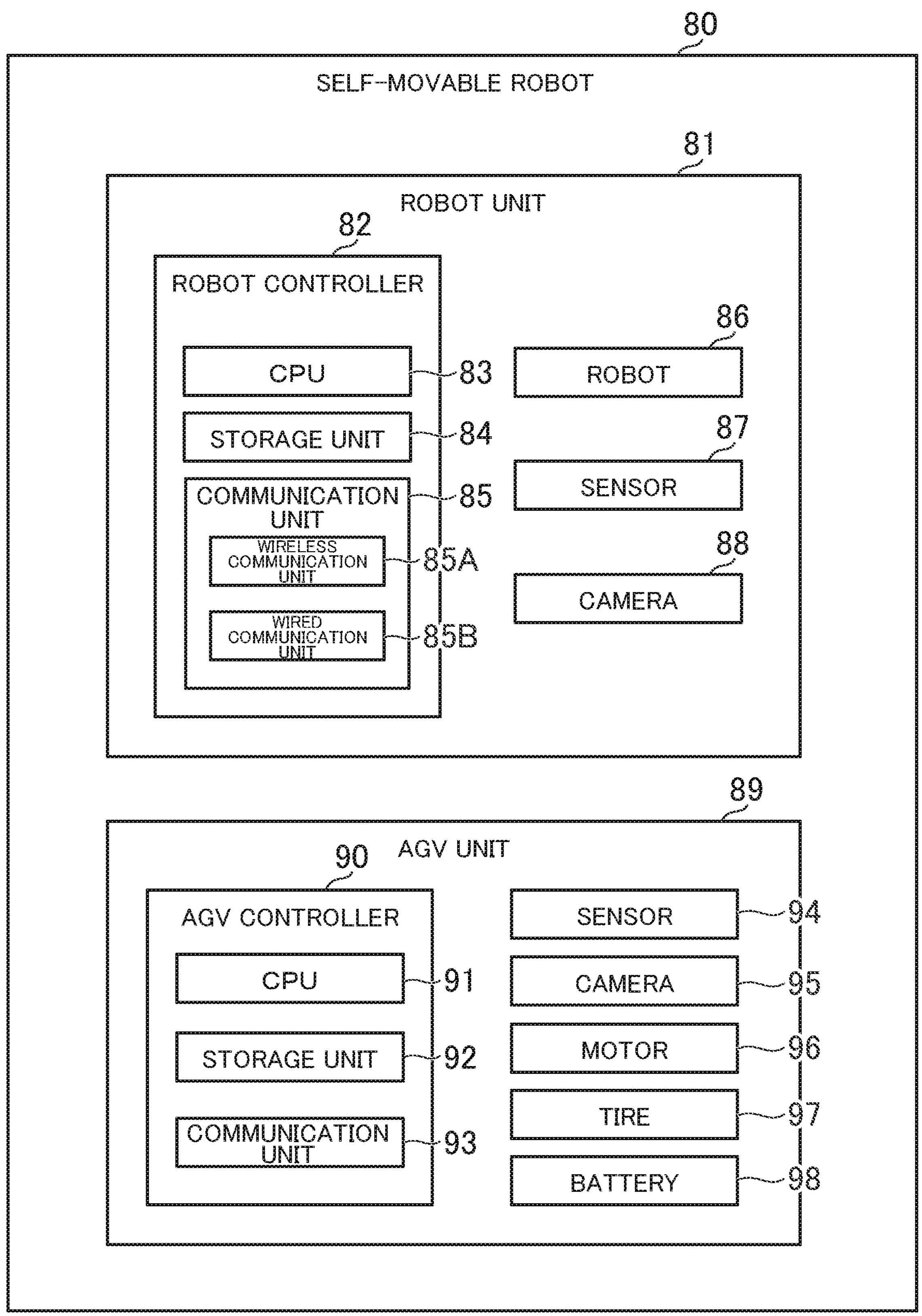
FIG. 2 is a diagram illustrating an example of a detailed configuration of a self-movable robot.

The inventors have considered moving a self-movable industrial device to each of a plurality of locations sequentially to execute a job. In this case, it is necessary to have the self-movable industrial device prepare for the job at each location. For example, if the self-movable industrial device arrives at a location and then starts preparation for the job at the location, the job cannot be started until the preparation is completed, and the production efficiency in the production system decreases. Accordingly, as a result of intensive research and development to improve production efficiency in the production system, the inventors have conceived of a new and original production system. In the following, an embodiment (hereinafter referred to as embodiment 1) of the production system will be described.

[1-1. Overall Configuration of Production System]

FIG. 1 is a diagram illustrating an example of an overall configuration of a production system according to the embodiment 1. As shown in FIG. 1, a production system S includes a scheduling device 10, an instruction device 20, an information collecting device 30, a simulation device 40, a cell controller 50, a robot controller 60, a robot 70, and a self-movable robot 80, for example. FIG. 1 shows one device for each device, although there may be a plurality of each device. The production system S may include other devices, or some devices may be omitted.

The scheduling device 10 is a computer that manages a schedule of the entire production system S. A schedule is a plan that indicates when and what a job to do, and may also be referred to as a production plan or a job plan. In the present embodiment, the production system S includes a plurality of cells, and the scheduling device 10 manages schedules of the cells. For example, the scheduling device 10 manages a rough schedule such as when and what a job is to be performed in each cell, and the instruction device 20 determines a specific job.

A cell is a group in the production system S and similar to a line in terms of a concept. In this embodiment, a cell is smaller unit than a line, but the concept of the cell is not limited to this. There may be only one cell. At least one industrial device belongs to a cell. The Industrial devices belonging to the same cell execute a job in cooperation with each other. In this embodiment, the self-movable robot 80 joins and leaves the cell, and thus the number of industrial devices belonging to the cell fluctuates.

The industrial device is a device for performing a job on behalf of a human being. The industrial device performs the job on a job object. For example, the cell controller 50, the robot controller 60, the robot 70, and the self-movable robot 80 correspond to industrial devices. The industrial device is not limited these examples and may be any type of device. For example, the industrial device may be a machine tool, a transport apparatus, a motor controller, or a programmable logic controller (PLC). For example, the industrial device may be a sensor such as a motor encoder, an I/O device, or a vision camera.

The job is a physical operation performed by the industrial device, and may also be referred to as a process. For example, the job may be process, detection, transport, or inspection of a job object. The job object is a so-called a work, and is, for example, a component of an automobile or a motorcycle, an electric product, a material of ceramics or resin, or a food. For example, the job object is placed on a transport apparatus, such as a belt conveyer, to be moved and processed. Further, for example, the job object is grasped by the robot 70 or the self-movable robot 80 and processed.

For example, the scheduling device 10 may be a server computer or a personal computer. The scheduling device 10 includes a CPU 11, a storage unit 12, and a communication unit 13. The CPU 11 is an example of a configuration called a circuitry, and includes at least one processor, for example. The storage unit 12 includes a RAM, an EEPROM, and a hard disk. The storage unit 12 stores programs and data. The CPU 11 performs processing based on the programs and data. The communication unit 13 includes at least one of a communication interface for wired communication and a communication interface for wireless communication. The communication unit 13 may include both of these or may include only one of them.

The instruction device 20 is a computer for instructing a specific job based on a schedule managed by the scheduling device 10. For example, the instruction device 20 generates a program necessary for each job based on a rough schedule received from the scheduling device 10. In other words, the instruction device 20 embodies the rough instruction received from the scheduling device 10 and gives a specific instruction to each cell.

For example, the instruction device 20 may be a server computer or a personal computer. The instruction device 20 includes a CPU 21, a storage unit 22, and a communication unit 23. The physical configurations of the CPU 21, the storage unit 22, and the communication unit 23 may be the same as those of the CPU 11, the storage unit 12, and the communication unit 13, respectively.

The information collecting device 30 is a computer that collects various types of information in the production system S. For example, the information collecting device 30 obtains trace data in which results of operations of the industrial devices belonging to the respective cells are stored in time series. The trace data indicates time-series changes in physical quantities detected by, for example, a sensor 71 to be described later. For example, the information collecting device 30 may obtain an image or video captured by a camera 72. Further, the information collecting device 30 may analyze the information collected by itself. For example, the information collecting device 30 may analyze a cause of an alarm, or evaluate quality of a job object or a final product based on the collected information.

For example, the information collecting device 30 may be a server computer or a personal computer. The information collecting device 30 includes a CPU 31, a storage unit 32, and a communication unit 33. The physical configurations of the CPU 31, the storage unit 32, and the communication unit 33 may be the same as those of the CPU 11, the storage unit 12, and the communication unit 13, respectively.

The simulation device 40 is a computer for simulating the job of the entire production system S. For example, the simulation device 40 inputs instructions entered for each industrial device into a known simulator to obtain simulation results of the job. The simulation device 40 compares the actual operation results obtained by the information collecting device 30 with the simulation results. The simulation device 40 determines whether these results are deviated, and if they are deviated, changes the program or notifies an administrator. The deviation means that results as simulated (expected results) are not obtained.

For example, the simulation device 40 is a server computer or a personal computer. The simulator 40 includes a CPU 41, a storage unit 42, and a communication unit 43. The physical configurations of the CPU 41, the storage unit 42, and the communication unit 43 may be the same as those of the CPU 11, the storage unit 12, and the communication unit 13, respectively.

The cell controller 50 is an industrial device that controls a cell. In this embodiment, a case will be described in which one cell controller 50 is included in each cell, although a plurality of cell controllers 50 may be included in each cell. In addition, the cell may include a higher-level industrial device than the cell controller 50. The cell controller 50 controls the industrial device belonging to itself. When a self-movable robot 80 arrives at the cell and is connected to the cell controller 50, the cell controller 50 controls the self-movable robot 80. When the self-movable robot 80 leaves the cell, the self-movable robot 80 is removed from the control of the cell controller 50.

For example, the cell controller 50 includes a CPU 51, a storage unit 52, and a communication unit 53. The physical configurations of the CPU 51, the storage unit 52, and the communication unit 53 may be the same as those of the CPU 11, the storage unit 12, and the communication unit 13, respectively.

The robot controller 60 is an industrial device for controlling the robot 70. For example, the robot controller 60 controls the power to the motor in the robot 70 to move a robot arm or open and close a robot hand based on an instruction from the cell controller 50. The robot 70 of the present embodiment is a fixed type, and the robot arm and the robot hand move but the robot 70 itself does not move.

For example, the cell includes a sensor 71, a camera 72, and a communication device 73 in addition to the robot 70. The sensor 71 may be any sensor capable of detecting a physical quantity, for example, a motor encoder, a torque sensor, a temperature sensor, a motion sensor, or a pressure-sensitive sensor. FIG. 1 shows only one sensor 71, although the cell may include a plurality of sensors 71. The data obtained by the sensor 71 may also be referred to as sensing data.

The camera 72 is a camera for capturing a state of the cell. The camera 72 is utilized in place of visual confirmation by a human and is also referred to as a vision camera (vision sensor). For example, the camera 72 captures each of the robot 70 and the job object in the cell and generates an image or video. For example, the camera 72 transmits the captured image or video to other devices such as the information collecting device 30, the cell controller 50, and the robot controller 60. If the camera 72 is provided with an image analyzing function, the camera 72 transmits the analysis result. The analysis result may be the current state of the robot 70 or the current state of the job object.

The communication device 73 is a communication interface for wired communication. The communication device 73 is connected to a self-movable robot 80 that has arrived at its cell. For example, the self-movable robot 80 approaches the communication device 73 of the cell, which is the destination, and connects a wired communication unit 85B described later to the communication device 73. Thereby, wired communication between the self-movable robot 80 and the destination cell is established. The communication device 73 may use a device of any communication standard, for example, a dedicated communication standard such as IO-Link (registered trademark) or a common communication standard such as Ethernet (registered trademark). For example, the communication device 73 may have a communication connector into which a communication cable is insertable, or may implement pseudo wired communication using infrared rays (not insertion-type communication but contact-type wired communication).

The self-movable robot 80 is a self-movable industrial device. The self-movable means running by its own power. The self-movable industrial device may be any industrial device having a self-movable function, and is not limited to the self-movable robot 80. For example, the self-movable industrial device may be a self-movable machine tool, a self-movable transport device, a self-movable motor controller, a self-movable PLC, a self-movable sensor, or a self-movable camera.

In the present embodiment, the self-movable robot 80 may freely move to any location. For example, the self-movable robot 80 moves between one cell and another cell. The self-movable robot 80 is not limited to the movement between the cells, and may move within the cell or may move to a location that is not related to the cell. In the present embodiment, a case will be described in which the self-movable robot 80 moves freely on a floor, although the self-movable robot 80 may move on a rail. For example, rails may be disposed between the cells, and the self-movable robot 80 may move between the cells by moving on the rails.

FIG. 2 is a diagram illustrating an example of a detailed configuration of the self-movable robot 80. As shown in FIG. 2, the self-movable robot 80 includes a robot unit 81 and an automated guided vehicle (AGV) unit 89. The self-movable robot 80 may not be divided into the robot unit 81 and the AGV unit 89, and they may be integrated and may not be distinguished from each other.

The robot unit 81 performs jobs in the cell in which the self-movable robot 80 has moved. For example, the robot unit 81 includes a robot controller 82, a robot 86, a sensor 87, and a camera 88. In FIG. 2, the number of each of them is one, although each of them may be plural. The robot unit 81 may include other devices. For example, the robot unit 81 may include a spare end effector or a battery.

The physical configurations of the robot controller 82, the robot 86, the sensor 87, and the camera 88 may be the same as those of the robot controller 60, the robot 70, the sensor 71, and the camera 72, respectively. The camera 88 is used not only for detecting a job object but also for detecting the communication device 73.

For example, the robot controller 82 includes a CPU 83, a storage unit 84, and a communication unit 85. The physical configurations of the CPU 83, the storage unit 84, and the communication unit 85 may be the same as those of the CPU 11, the storage unit 12, and the communication unit 13, respectively.

The robot controller 82 may not be mounted on the self-movable robot 80. In this case, the cell controller 50 may be connected to the robot controller 82 for the self-movable robot 80, and when the self-movable robot 80 arrives at the cell, the robot controller 82 may control the robot 86 mounted on the self-movable robot 80. If the robot controller 82 is not mounted on the self-movable robot 80, the self-movable robot 80 can be reduced in weight.

In this embodiment, wireless communication is used while the self-movable robot 80 is moving, and switched to wired communication when the self-movable robot 80 arrives at the cell. As such, the job performed after the self-movable robot 80 arrives at the cell can be synchronized with data in a fine control cycle not by using wireless communication having insufficient reliability, immediacy, and throughput, but by using wired communication in which these are sufficiently secured. For example, the communication unit 85 includes a wireless communication unit 85A, which is a communication interface for wireless communication, and a wired communication unit 85B, which is a communication interface for wired communication.

The wireless communication unit 85A includes, for example, a communication card and an antenna for wireless communication. The wireless communication unit 85A may use any communication standard, for example, wireless LAN, WiFi (registered trademark), or Bluetooth (registered trademark). The wired communication unit 85B includes, for example, a communication card and a connector for wired communication. The wired communication unit 85B may also use any communication standard, although in this embodiment, wired communication is implemented by using the communication device 73 in the cell, and thus the wired communication unit 85B uses the same communication standard as the communication device 73. This communication standard is as described above.

The AGV unit 89 is a so-called automatic guided vehicle or a carriage. For example, the AGV unit 89 includes an AGV controller 90, a sensor 94, a camera 95, a motor 96, tires 97, and a battery 98. In FIG. 2, the number of each of them is one, although each of them may be plural.

The AGV controller 90 is a computer that controls movement of the self-movable robot 80. The AGV controller 90 controls the movement of the self-movable robot 80 based on a predetermined movement path. The movement control itself of the self-movable robot 80 may use various known methods, for example, a self-movable control algorithm employed in a cleaning robot, and an automatic driving technique employed in an automobile. Further, for example, the movement control of the self-movable robot 80 may be implemented by an open source called ROS.

For example, the AGV controller 90 is a personal computer, a tablet terminal, or a smart phone. For example, the AGV controller 90 includes a CPU 91, a storage unit 92, and a communication unit 93. The physical configurations of the CPU 91, the storage unit 92, and the communication unit 93 may be the same as those of the CPU 11, the storage unit 12, and the communication unit 13, respectively.

The sensor 94 detects a status around the self-movable robot 80. For example, the sensor 94 may be a depth sensor, ultrasound sensor, infrared sensor, object detection sensor, indoor GPS sensor, beacon sensor, RFID sensor, geomagnetic sensor, gyro-sensor, or motion sensor. The camera 95 is a camera for capturing a view around the self-movable robot 80. The camera 95 may have the physical configuration similar to that of the cameras 72 and 88, and may be a so-called vision sensor.

For example, upon receiving a predetermined movement instruction from the instruction device 20, the AGV controller 90 generates a movement path to the destination included in the movement instruction. The AGV controller 90 supplies power from the battery 98 to the motor 96 to control the rotation of the tires 97 so as to move along the generated movement path based on the information obtained from each of the sensor 94 and the camera 95.

The AGV controller 90 may not be mounted on the self-movable robot 80. In this case, the self-movable robot 80 may receive an instruction from another computer (e.g., instruction device 20) and may move based on the instruction. For example, another computer having a function equivalent to that of the AGV controller 90 is disposed in the facility, and the self-movable robot 80 moves between the cells by communicating with the other computer. If the AGV controller 90 is not mounted on the self-movable robot 80, the self-movable robot 80 can be reduced in weight.

Further, the program and data described as being stored in each of the scheduling device 10, the instruction device 20, the information collecting device 30, the simulation device 40, the cell controller 50, the robot controller 60, and the self-movable robot 80 may be supplied via a network. Further, the hardware configuration of each device is not limited to the above example, and various types of hardware can be applied. For example, a reading unit (e.g., an optical disk drive or a memory card slot) for reading a computer-readable information storage medium or an input/output unit (e.g., a USB terminal) for directly connecting to an external device may be included. In this case, the program and data stored in the information storage medium may be supplied through the reading unit or the input/output unit. Further, an application specific integrated circuit called ASIC may also be included.

[1-2. Outline of Production System]

In this embodiment, the processing of the production system S will be described by taking an example of a case where so-called multi-product small-volume production is implemented. In the multi-product small-volume production, products produced in each cell changes fluidly, and thus the number of industrial devices required in each cell also changes fluidly. For example, only fixed-type robots 70 fixed to the cell are sufficient to perform jobs in a certain time period, but in other time periods, the fixed robots 70 alone may be insufficient.

In this regard, if the maximum number of fixed robots 70 required at a cell are disposed for all the cells, the job according to the schedule may be possible, but the cost in the production system S increases. That is, in a time zone in which the job can be done with fewer robots 70, the robot 70 that does nothing is wasteful. As such, in the production system S, the self-movable robot 80 is moved to the cell as necessary so as to reduce the number of fixed robots 70.

Figure 3:
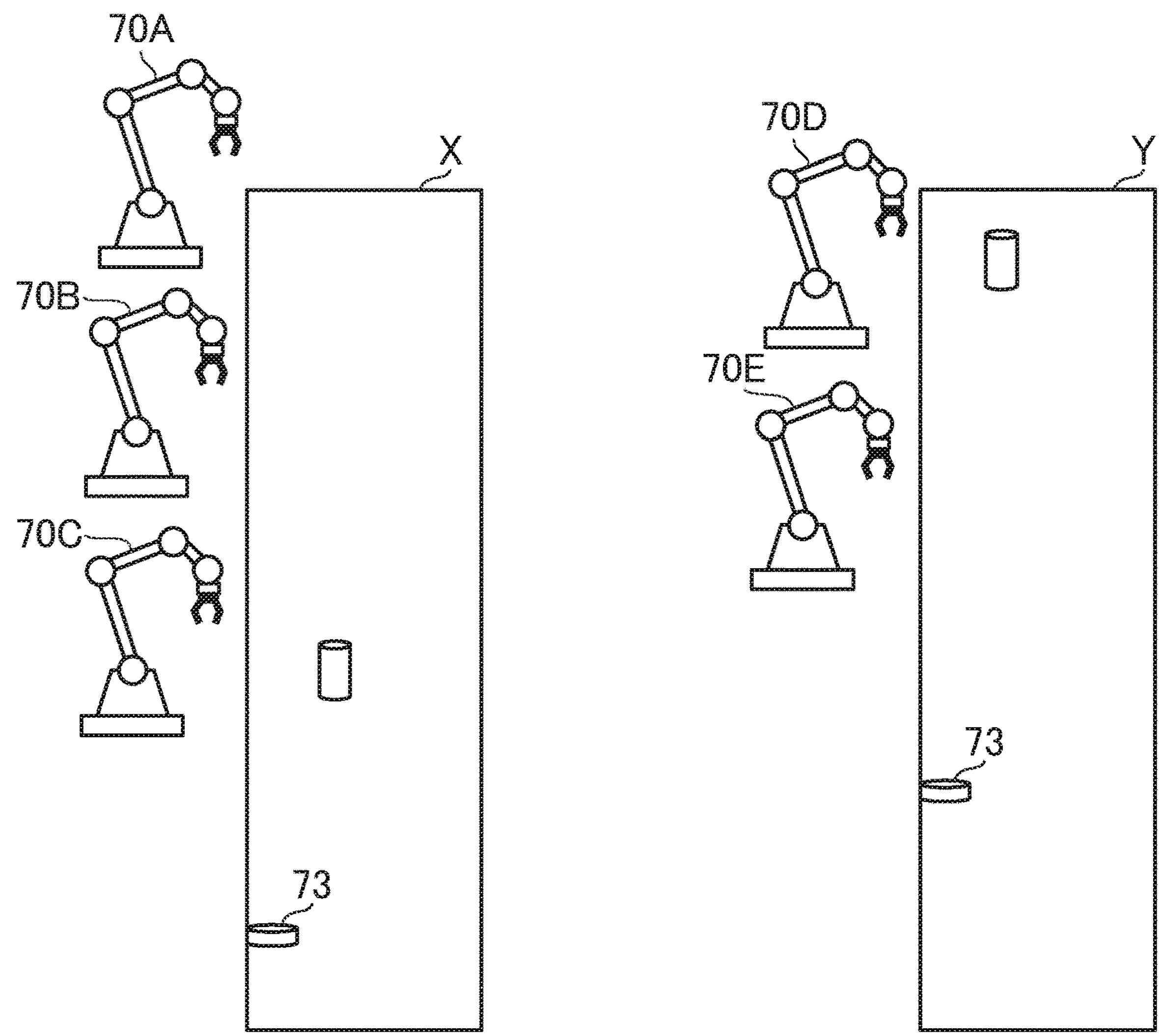
FIG. 3 is a diagram illustrating an example of a cell in a production system.

FIGS. 3 to 6 are diagrams illustrating examples of cells in the production system S. In these drawings, the number of cells is two for explanation, although the number of cells may be three or more. Further, the number of self-movable robot 80 is described as one, although the number of self-movable robots 80 may be two or more. As shown in FIG. 3, the fixed robots 70A to 70C are disposed in a cell X, and the fixed robots 70D and 70E are disposed in a cell Y. In FIGS. 3 to 6, other devices such as the instruction device 20 are omitted.

In the state of FIG. 3, the self-movable robot 80 is located away from the cells X and Y and does not belong to any cell. For example, the self-movable robot 80 is connected to the instruction device 20 by wireless communication and stands by on the spot. The wireless communication may be implemented by at least one of the wireless communication unit 85A of the robot controller 82 and the communication unit 93 of the AGV controller 90. Both of them may be used for wireless communication, or only one of them may be used for wireless communication.

When the time at which the self-movable robot 80 moves to any of the cells arrives, the instruction device 20 transmits a movement instruction to the self-movable robot 80. Assume that the movement instruction includes a specific position of the destination of the self-movable robot 80 in the cell. In this embodiment, the move robot 80 switches from wireless communication to wired communication upon arriving at the cell of the destination, and thus the position of the destination is close to the communication device 73 of the cell of the destination.

Here, a case where the self-movable robot 80 is instructed to move to the cell Y will be described as an example. When the self-movable robot 80 receives a movement instruction from the instruction device 20 to move to the cell Y, the AGV controller 90 generates a movement path to the cell Y. The AGV controller 90 controls the motor 96 so as to move on the generated movement path.

As shown in FIG. 4, while moving toward the cell Y, the self-movable robot 80 downloads data necessary for the next job (job in the cell Y) from the instruction device 20 by wireless communication. The self-movable robot 80 records the downloaded data in the storage unit 84 of its robot controller 82. This eliminates the need for the self-movable robot 80 to download the data after arriving at the cell Y.

When arriving at the vicinity of the communication device 73 of the cell Y, the self-movable robot 80 detects the communication device 73 using the sensor 87 and the camera 88, and connects its wired communication unit 85B to the communication device 73. That is, a plug-in is performed. When they are connected to each other, the self-movable robot 80 switches from wireless communication to wired communication, and communicates with the cell controller 50 of the cell Y, for example. Upon establishing the wired communication connection, the self-movable robot 80 executes the processing necessary for the job in the cell Y. Examples of this processing include processing for synchronizing with the other robots 70D and 70E of the cell Y, and performing calibration of the self-movable robot 80. The details of such processing will be described in the embodiment 2 and the modified examples.

The self-movable robot 80 has already downloaded the data necessary for the next job by the wireless communication while moving to the cell Y, and thus, when the above-described processing executed with the cell controller 50 is completed, the job in the cell Y can be immediately started. The self-movable robot 80 performs the job in the cell Y based on the downloaded data and the instruction received from the cell controller 50 by the wired communication.

When the job in the cell Y is completed, the self-movable robot 80 disconnects the communication device 73 of the cell Y and deletes the downloaded data. The data may be held without being deleted. When leaving the cell Y, the self-movable robot 80 disconnects the wired communication to switch to the wireless communication. Upon establishing the wireless communication with the instruction device 20, the self-movable robot 80 waits for the next movement instruction. The self-movable robot 80 may stay on the spot or may move away from the cell Y.

Here, a case where movement to the cell X is instructed will be described as an example. As shown in FIG. 5, when the self-movable robot 80 receives a movement instruction from the instruction device 20, the AGV controller 90 generates a movement path, and the self-movable robot starts moving toward the cell X. As shown in FIG. 6, while moving toward the cell X, the self-movable robot 80 downloads data necessary for the job in the cell X from the instruction device 20. This eliminates the need for the self-movable robot 80 to download the data after arriving at the cell X.

When arriving at the vicinity of the communication device 73 of the cell X, the self-movable robot 80 detects the communication device 73 using the sensor 87 and the camera 88, and connects its wired communication unit 85B to the communication device 73. Thereafter, the self-movable robot 80 executes the same procedure as that in the case of arriving at the cell Y, and starts the job in the cell X. The self-movable robot 80 moves according to the schedule and executes the job until all the job for the day is completed. The self-movable robot 80 is not limited to move between the cells, and may move to a predetermined standby location for the purpose of charging, for example. Such movement is also scheduled by the scheduling device 10.

As described above, the production system S of the present embodiment causes the self-movable robot 80 to prepare for the next job before the self-movable robot 80 arrives at the next cell, thereby causing the next job to be started earlier and improving the production efficiency in the production system S. In the following, the detailed configuration of the production system S will be described.

[1-3. Functions Implemented in Production System]

FIG. 7 is a functional block diagram showing functions implemented in the production system S. Thereafter, functions implemented in each of the scheduling device 10, the instruction device 20, the information collecting device 30, the simulation device 40, the cell controller 50, the robot controller 60, and the self-movable robot 80 will be described.

[1-3-1. Functions Implemented in Scheduling Device]

In the scheduling device 10, a data storage unit 100 and a schedule control unit 101 are implemented. The data storage unit 100 is implemented mainly by the storage unit 12, and the schedule control unit 101 is implemented mainly by the CPU 11.

[Data Storage Unit]

The data storage unit 100 stores schedule data relating to a schedule of the entire production system S. FIG. 8 is a diagram showing an example of data storage of the schedule data. As shown in FIG. 8, the schedule data stores job order, job ID, cell ID, industrial device ID, and content of the job. The job order is the order of the job in one day. The job ID is an ID that uniquely identifies the job. The cell ID is an ID that uniquely identifies a cell. The industrial device ID is an ID for uniquely identifying an industrial device. The content of the job is the job to be performed by the industrial device indicated by the industrial device ID. As mentioned above, in this embodiment, the job is scheduled roughly, and thus the content of the job stored in the schedule data is rough. The schedule data is generated by the administrator of the production system S.

[Schedule Control Unit]

The schedule control unit 101 controls the schedule of the production system S based on the schedule data. For example, when a certain job order arrives, the schedule control unit 101 transmits a cell ID, an industrial device ID, and the job content of such job to the instruction device 20. Further, for example, upon receiving a completion notification of the currently performed the job from the instruction device 20, the schedule control unit 101 refers to the schedule data to specify the job in the next job order, and obtains the cell ID, the industrial device ID, and the content of the job. The schedule control unit 101 transmits the obtained information to the instruction device 20. Thereafter, the schedule control unit 101 instructs the instruction device 20 about the job in accordance with the schedule defined in the schedule data until all the job for the day is completed.

[1-3-2. Functions Implemented in Instruction Device]

In the instruction device 20, a data storage unit 200, an instruction unit 201, and a receiving unit 202 are implemented. The data storage unit 200 is implemented mainly by the storage unit 22, and each of the instruction unit 201 and the receiving unit 202 is implemented mainly by the CPU 21.

[Data Storage Unit]

The data storage unit 200 stores data necessary for various instructions to the industrial devices. The instruction device 20 mainly instructs the self-movable robot 80 to move and instructs the cell controller 50 to perform a specific job, and thus the data storage unit 200 stores data required for these instructions. For example, the data storage unit 200 stores position information of each cell and map information of the facilities of the production system S. In this embodiment, the self-movable robot 80 move to the vicinity of the communication device 73 in the cell, and thus the data storage unit 200 stores the position information of the communication devices 73 in the respective cells.

For example, the data storage unit 200 stores a job program and setting data to be transmitted to the cell controller 50 and the self-movable robot 80. The job program is a program in which the procedure of the job is defined. In the job program, the procedure from the start to the end of the job is indicated in time series. The job program may be generated in any language, such as a ladder language and a robotic language. In this embodiment, the instruction device 20 generates the job program, although the job program may be stored in the instruction device 20 in advance. The job program itself may be generated by a known method.

The setting data relates to the setting of the job content. For example, the setting data is a parameter such as a torque value. The teaching data in the robot control is also an example of the setting data. As in the modified example to be described later, the setting data may be adjusted by the position and the orientation of the self-movable robot 80 after the arrival.

[Instruction Unit]

The instruction unit 201 transmits an instruction to each industrial device. For example, the instruction unit 201 transmits a movement instruction including a position of a destination to the self-movable robot 80. Further, for example, the instruction unit 201 transmits a job program and setting data stored in the data storage unit 200 as a job instruction to the cell controller 50 and the self-movable robot 80. In this embodiment, when receiving a job completion notification, the instruction unit 201 instructs the self-movable robot 80 to move to the next location. The instruction unit 201 instructs the self-movable robot 80 to move to the next location on condition that the job completion notification is received. When the job completion notification is not received, the instruction unit 201 does not instruct the self-movable robot 80 to move to the next location, and instructs the self-movable robot 80 to move to the next location in response to the reception of the job completion notification.

[Receiving Unit]

The receiving unit 202 receives a predetermined job completion notification. The job completion notification is a notification indicating that the job has been completed, and is performed by transmitting data in a predetermined format. For example, the job completion notification includes information such as a job ID of the industrial device that has completed the job, and a job ID of the completed job. In this embodiment, the receiving unit 202 receives the job completion notification from the cell controller 50, although the receiving unit 202 may receive the job completion notification from other devices such as the robot controllers 60 and 82.

[1-3-3. Functions Implemented in Information Collecting Device]

In the information collecting device 30, a data storage unit 300 and an information collecting unit 301 are implemented. The data storage unit 300 is mainly implemented by the storage unit 32, and the information collecting unit 301 is mainly implemented by the CPU 31.

[Data Storage Unit]

The data storage unit 300 stores various types of data relating to the production system S. For example, the data storage unit 300 stores trace data generated by each of the robot controllers 60 and 82. For example, the data storage unit 300 stores an image or video captured by the camera 72. For example, the data storage unit 300 stores a state of the industrial device and a state of a job object that are obtained by analyzing the image or the video. For example, the data storage unit 300 stores information transmitted by the self-movable robot 80 when the self-movable robot 80 arrives at each cell.

[Information Collecting Unit]

The information collecting unit 301 collects various types of data relating to the production system S. For example, the information collecting unit 301 collects trace data and an image or video captured by the camera 72 from the cell controller 50. For example, when image analysis is performed by the cell controller 50, the information collecting unit 301 collects an analysis result of the image analysis (a state of the industrial device or a state of the job object) from the cell controller 50. For example, the information collecting unit 301 collects information transmitted from the self-movable robot 80 when the self-movable robot 80 arrives at each cell.

[1-3-4. Functions Implemented in Simulation Device]

In the simulation device 40, a data storage unit 400 and a simulation executing unit 401 are implemented. The data storage unit 400 is implemented mainly by the storage unit 42, and the simulation executing unit 401 is implemented mainly by the CPU 41.

[Data Storage Unit]

The data storage unit 400 stores data required for executing simulations. For example, the data storage unit 400 stores simulators. The simulator is a program developed for the simulation of the industrial device. Various well-known simulators may be used for the simulator itself, and for example, a robot simulator provided by the industrial device manufacturer may be used. Further, for example, the data storage unit 400 stores simulation results by the simulator.

[Simulation Executing Unit]

The simulation executing unit 401 executes a simulation. For example, the simulation executing unit 401 obtains the content of the instruction of the job from the instruction device 20, the information collecting device 30, or the cell controller 50. The simulation executing unit 401 inputs the obtained instruction content to the simulator and obtains the simulation result. For example, the state of the industrial device or the state of the job object may be obtained as the simulation result. The simulation executing unit 401 compares the simulation result with the trace data stored in the information collecting device 30, for example, to verify the degree of deviation of them.

[1-3-5. Functions Implemented in Cell Controller]

In the cell controller 50, a data storage unit 500, a cell control unit 501, and a transmitting unit 502 are implemented. The data storage unit 500 is mainly implemented by the storage unit 52, and the cell control unit 501 and the transmitting unit 502 are mainly implemented by the CPU 51.

[Data Storage Unit]

The data storage unit 500 stores data required for controlling the industrial devices in the cell (i.e., industrial devices to be managed by the cell controller 50). For example, the data storage unit 500 stores the job program and the setting data received from the instruction device 20. Further, for example, the data storage unit 500 stores data in which various types of information of the industrial devices in the cell is stored. Such information includes industrial device IDs, IP addresses, serial numbers or model numbers of the industrial devices in the cell, for example. Further, for example, the data storage unit 500 may store the job program and the setting data generated in advance by the administrator instead of the job program and the setting data received from the instruction device 20.

[Cell Control Unit]

The cell control unit 501 controls the industrial devices in the cell based on the data stored in the data storage unit 500. For example, the cell control unit 501 executes a job program and determines an instruction to the robot controller 60 by using the setting data as an argument. The cell control unit 501 sends the instruction to the robot controller 60. The cell control unit 501 receives the response from the robot controller 60 and records the response in the data storage unit 500 in time series.

When the self-movable robot 80 arrives at the cell and starts the job, the cell control unit 501 transmits an instruction to the robot controller 82 of the self-movable robot 80 similarly to the robot controller 60 that controls the fixed robot 70. The cell control unit 501 receives responses and trace data from the robot controllers 60 and 82. For example, the instruction or the response of the job content is performed by synchronous communication, and transmission of the trace data is performed by asynchronous communication. The communication may be performed by periodic communication, or the cycle may not be particularly determined.

The cell control unit 501 transmits the trace data, for example, collected from the robot controller 60 and the self-movable robot 80 to the information collecting device 30. The timing at which the cell control unit 501 transmits the trace data to the information collecting device 30 may be freely determined. For example, the data may be uploaded one by one to the information collecting device 30, or the administrator may upload the data by a predetermined operation. Further, for example, the trace data may be transmitted directly from each of the robot controller 60 and the self-movable robot 80 to the information collecting device 30.

[Transmitting Unit]

When the current job of the robots 70 and 86 is completed, the transmitting unit 502 transmits a predetermined job completion notification to the instruction device 20. The transmitting unit 502 transmits the job completion notification to the instruction device 20 on condition that the current job of the robots 70 and 86 is completed. When the current job of the robots 70 and 86 is not completed, the transmitting unit 502 does not transmit the job completion notification to the instruction device 20, and transmits the job completion notification to the instruction device 20 in response to completion of the current job of the robots 70 and 86.

[1-3-6. Functions Implemented in Robot Controller]

In the robot controller 60, a data storage unit 600 and a job control unit 601 are implemented. The data storage unit is mainly implemented by the storage unit 62, and the job control unit 601 is mainly implemented by the CPU 61.

[Data Storage Unit]

The data storage unit 600 stores data required for controlling the robot 70. For example, the data storage unit 600 stores the job program and setting data received from the cell controller 50. Further, for example, the data storage unit 600 may store a job program and setting data generated by the administrator in advance instead of the program and data received from the cell controller 50. For example, the data storage unit 600 stores the tracing data prior to be transmitted.

[Job Control Unit]

The job control unit 601 controls the robot 70 based on the data stored in the data storage unit 600. For example, the job control unit 601 executes the job program and uses the setting data as an argument to control the voltage to the motor in the robot 70 so that the robot 70 performs the desired movement. When completing the instruction from the robot controller 60, the job control unit 601 transmits a response to the cell controller 50.

[1-3-7. Functions Implemented in Self-Movable Robot]

As shown in FIG. 7, in the self-movable robot 80, a data storage unit 800, a movement control unit 801, a communication control unit 802, a preparation control unit 803, and a job control unit 804 are implemented.

[Data Storage Unit]

The data storage unit 800 stores the data required for moving to the cell to perform a job. For example, the data storage unit 800 includes a first data storage unit 800A and a second data storage unit 800B.

The first data storage unit 800A is implemented mainly by the storage unit 84 of the robot controller 82. The first data storage unit 800A stores data required for the job after arriving at the cell. In this embodiment, such data is downloaded while moving, although the data may be stored in the first data storage unit 800A in advance. In this embodiment, as an example of such data, a job program and setting data will be described. As described above, each of the job program and the setting data is generated by the instruction device 20. For example, the first data storage unit 800A may store the trace data in accordance with the job of the self-movable robot 80.

The second data storage unit 800B is implemented mainly by the storage unit 92 of the AGV controller 90. The second data storage unit 800B stores the data required to move to the cell. In this embodiment, such data is generated by the movement control unit 801 to be described later, although the data may be received from the instruction device 20 or stored in the second data storage unit 800B in advance. The movement path data will be described as an example of such data. The second data storage unit 800B also stores a path search algorithm for generating movement path data.

The movement path is data indicating a path from the current position of the self-movable robot 80 to the destination. The movement path data indicates positions to which the self-movable robot 80 moves in time series. For example, the movement path data is indicated by coordinates on a map indicating facilities such as a factory. Assume that the map data is stored in the second data storage unit 800B in advance. The movement path data may not be shown on the map.

[Movement Control Unit]

The movement control unit 801 is implemented mainly by the CPU 91 of the AGV controller 90. The movement control unit 801 controls movement of the self-movable robot 80. In the present embodiment, the movement instruction is transmitted by the instruction device 20, and thus the movement control unit 801 controls the movement of the self-movable robot 80 based on the position of the destination included in the movement instruction. In this embodiment, the destination is the next cell, and thus the movement control unit 801 controls the movement of the self-movable robot based on the location of the next cell included in the moving instruction. To control the movement means to control at least one of the moving direction and the moving speed.

For example, the movement control unit 801 obtains the current position based on at least one of a communication result of the communication unit 93, a detection signal of the sensor 94, and an image or video captured by the camera 95. The detection method of the current position may use a known method, for example, a position detection method used in indoor positioning. The detection method of the current position may use a method of detecting marks disposed indoors with images, a beacon positioning method, a positioning method by RFID, a positioning method by ultrasonic waves, a positioning method by geomagnetism, or a positioning method by wireless communication.

The movement control unit 801 inputs the current position and the destination into the path search algorithm and generates movement path data. The path search algorithm itself can use known techniques, for example, Dijkstra's algorithm and A-star algorithm. The movement control unit 801 controls the movement of the self-movable robot 80 based on the movement path data. For example, the movement control unit 801 obtains the current position of the self-movable robot 80 by the method described above, and moves the self-movable robot 80 so that the current position passes the movement path indicated by the movement path data. The movement control unit 801 repeats obtaining the current position and controlling the movement of the self-movable robot 80 until the self-movable robot 80 arrives at the next cell that is the last point on the moving path.

[Communication Control Unit]

The communication control unit 802 is mainly implemented by the CPU 83 of the robot controller 82. The communication control unit 802 controls the communication of the self-movable robot 80. In this embodiment, the communication control unit 802 controls the self-movable robot 80 to perform wireless communication while the self-movable robot 80 is moving toward the next location, and controls the self-movable robot 80 to perform wire communication via the communication device when the self-movable robot 80 arrives at the next location.

The next location is the destination of the self-movable robot 80. In this embodiment, the self-movable robot 80 moves between the cells, and thus the next cell as the destination corresponds to the next location. As such, in this embodiment, the next cell or the destination can be replaced with the next location. If the self-movable robot 80 moves to a different location within the same cell, the next location means the different location in the same cell.

"While moving toward the next location" is the period of time until the self-movable robot 80 arrives at the next location, for example, during the movement of the self-movable robot 80. The self-movable robot 80 does not need to continue to move, and may pause in the middle of the movement. The period of time in which the self-movable robot 80 pauses along the way is also included in the time of the movement to the next location. For example, while the self-movable robot 80 is moving, the communication control unit 802 uses the wireless communication unit 85A to enable the self-movable robot 80 to communicate wirelessly. In this embodiment, the self-movable robot 80 communicates wirelessly with the instruction device 20, although the self-movable robot 80 may communicate wirelessly with other devices such as the information collecting device 30 or the cell controller 50.

When the self-movable robot 80 arrives at the next location, the communication control unit 802 connects the wired communication unit 85B to the communication device 73 disposed at such a location, and switches from the wireless communication to the wire communication. Assume that the arrival of the self-movable robot 80 is detected by the movement control unit 801. For example, the communication control unit 802 turns off the wireless communication unit 85A and moves the wired communication unit 85B to be closer to the communication device 73.

For example, the communication control unit 802 specifies a specific position of the communication device 73 based on at least one of a communication result of the wireless communication unit 85A, a detected signal of the sensor 87, and an image or video captured by the camera 88. The communication control unit 802 moves the wired communication unit 85B so as to be closer to the specified position of the communication device 73. The wired communication unit 85B may be moved by controlling the motor in the robot unit 81 in the same manner as the control of the robot 86. The wired communication unit 85B may be moved by moving the self-movable robot 80 itself by the control of the AGV controller 90.

For example, in a case of the contact-type communication device 73 using infra-red rays, the communication control unit 802 moves the wired communication unit 85B until the wired communication unit 85B is in contact with the communication device 73. For example, in a case of the communication device 73 into which a communication cable is inserted, the communication control unit 802 moves the wired communication unit 85B until the communication cable of the wired communication unit 85B is inserted into the communication device 73. The wired communication may be established in the procedure in accordance with the communication standard. In this embodiment, the communication partner in the wired communication is the cell controller 50, although the communication partner in the wired communication may be other devices such as the instruction device 20, the information collecting device 30, and the robot controller 60.

The communication control unit 802 switches from the wired communication to the wireless communication after the self-movable robot 80 completes the job. The timing of switching from the wired communication to the wireless communication may be any timing after the job is completed, for example, immediately after the job is completed or after a certain period of time has elapsed. Assume that the completion of the job of the self-movable robot 80 is detected by the job control unit 804. The communication control unit 802 moves the wired communication unit 85B so that the wired communication unit 85B is disconnected from the communication device 73 and turns the wireless communication unit 85A on. The wireless communication may also be established in the procedure in accordance with the communication standard.

In this embodiment, switching between the wired communication and the wireless communication is performed for the communication unit 85 of the robot controller 82, and is not performed for the communication unit 93 of the AGV controller. As such, if the communication control unit 802 switches from the wireless communication to the wired communication, the wireless communication function of the AGV controller 90 is enabled, and as a whole, the self-movable robot 80 is capable of wireless communication with the instruction device 20.

[Preparation Control Unit]

The preparation control unit 803 is mainly implemented by the CPU 83. The preparation control unit 803 controls the self-movable robot 80 to prepare for the next job prior to arriving at the next location. In the present embodiment, the preparation control unit 803 is implemented by the self-movable robot 80, although the preparation control unit 803 may be implemented by another computer such as the instruction device 20, as in the modification examples described later.

"Prior to arriving at the next location" is any time before the self-movable robot 80 arrives at the next location. While this embodiment describes a case where moving to the next location corresponds to prior to arriving at the next location, it may correspond to other times, as in the modification examples described later. The next job is the job to be performed in the next location. In the present embodiment, specific content of the job is instructed from the instruction device 20, and thus the job instructed from the instruction device 20 corresponds to the next job.

The preparation is preparation required for the next job. The preparation control unit 803 may prepare for the job electronically or physically. In this embodiment, a case will be described in which electronic preparation is made by downloading data, although the electronic preparation is not limited to downloading data. For example, the electronic preparation may be reading data from an information storage medium, activating a job program, expanding data into RAM, completing initialization, or activating the robot controller 82 or the sensor 87.

In the present embodiment, the preparation control unit 803 includes a first preparation control unit 803A and a download control unit 803B. The first preparation control unit 803A controls the self-movable robot 80 to prepare for the next job while the self-movable robot 80 is moving toward the next location. That is, the first preparation control unit 803A controls the self-movable robot 80 to prepare for the next job while the self-movable robot 80 is moving. The first preparation control unit 803A does not need to spend all the time during the movement of the self-movable robots 80 for preparation, and the preparation may be completed along the way.

The download control unit 803B controls the self-movable robot 80 to download data to be used in the next job for preparation for the next location. In this embodiment, the download control unit 803B downloads a job program and setting data from the instruction device 20, and records the downloaded job program and setting data in the first data storage unit 800A. The self-movable robot 80 communicates wirelessly while moving, and thus the download control unit 803B downloads the data using wireless communication.

The preparation for the next job may be started at least before the self-movable robot 80 arrives at the next location, and the preparation does not have to be completed when the self-movable robot 80 arrives at the next location. For example, when the size of the job program and the setting data is large or the distance to the next location is short, the preparation may not be completed at the time of arrival at the next location. In this case, the preparation is continued after the arrival of the self-movable robot 80. In this case, if the communication is switched to the wired communication, the download control unit 803B may continue downloading using the wired communication. If not only the next job but also the next and a subsequent job (job two or more steps ahead) is determined, the preparation control unit 803 may prepare the next and the subsequent job.

[Job Control Unit]

The job control unit 804 is mainly implemented by the CPU 83. The job control unit 804 controls the self-movable robot 80 to perform the next job when the self-movable robot 80 arrives at the next location and the preparation for the next job is completed. In this embodiment, the job control unit 804 is implemented by the self-movable robot 80, although the job control unit 804 may be implemented by other computers such as the cell controller 50, as described later in the modified examples.

The job control unit 804 controls the self-movable robot 80 to perform the next job on condition that the self-movable robot 80 arrives at the next location and the preparation for the next job is completed. For example, the arrival at the next location is detected by the movement control unit 801. For example, the job control unit 804 may determine whether the self-movable robot 80 arrives at the next location. In this embodiment, the robot controller 60 and the communication device 73 for wired communication are disposed at the next location, and thus the job control unit 804 may determine whether the wired connection with the robot controller 60 has been established. The establishment of the wired connection means that the self-movable robot 80 has arrived at the next location.

The arrival of the self-movable robot 80 may be determined by any method. For example, the arrival of the self-movable robot 80 may be determined based on at least one of content of the communication of the wireless communication unit 85A, a signal detected by the sensor 94 of the AGV unit 89, and an image or video captured by the camera 95. In this case, a transmitter that emits a predetermined signal may be disposed or a predetermined mark may be arranged at the next location. Upon detecting the signal or the mark, the job control unit 804 determines that the self-movable robot 80 has arrived at the next location.

For example, the job control unit 804 determines whether the preparation for the next job is completed. The completion of the preparation may be determined by any method, for example, referring to the progress of the preparation by the preparation control unit 803 to determine whether the preparation is completed. The job control unit 804 controls the self-movable robotic 80 to perform the next job based on the preparation completed by the preparation control unit 803. A known method may be used for the method of executing the job. For example, the cell controller 50 and the robot controller 82 of the self-movable robot 80 communicate with each other to execute the next job.

In this embodiment, the job control unit 804 includes a first job control unit 804A. The first job control unit 804A controls the self-movable robot 80 to perform the next job when the self-movable robot 80 arrives at the next location and completes downloading of the data. For example, the first job control unit 804A determines whether the downloading of the data is completed by the download control unit 803B. To complete downloading of the data means that to complete the preparation for the next job. The first job control unit 804A performs the next job based on the downloaded data.

[1-4. Processing Executed in Production System]

Figure 9:
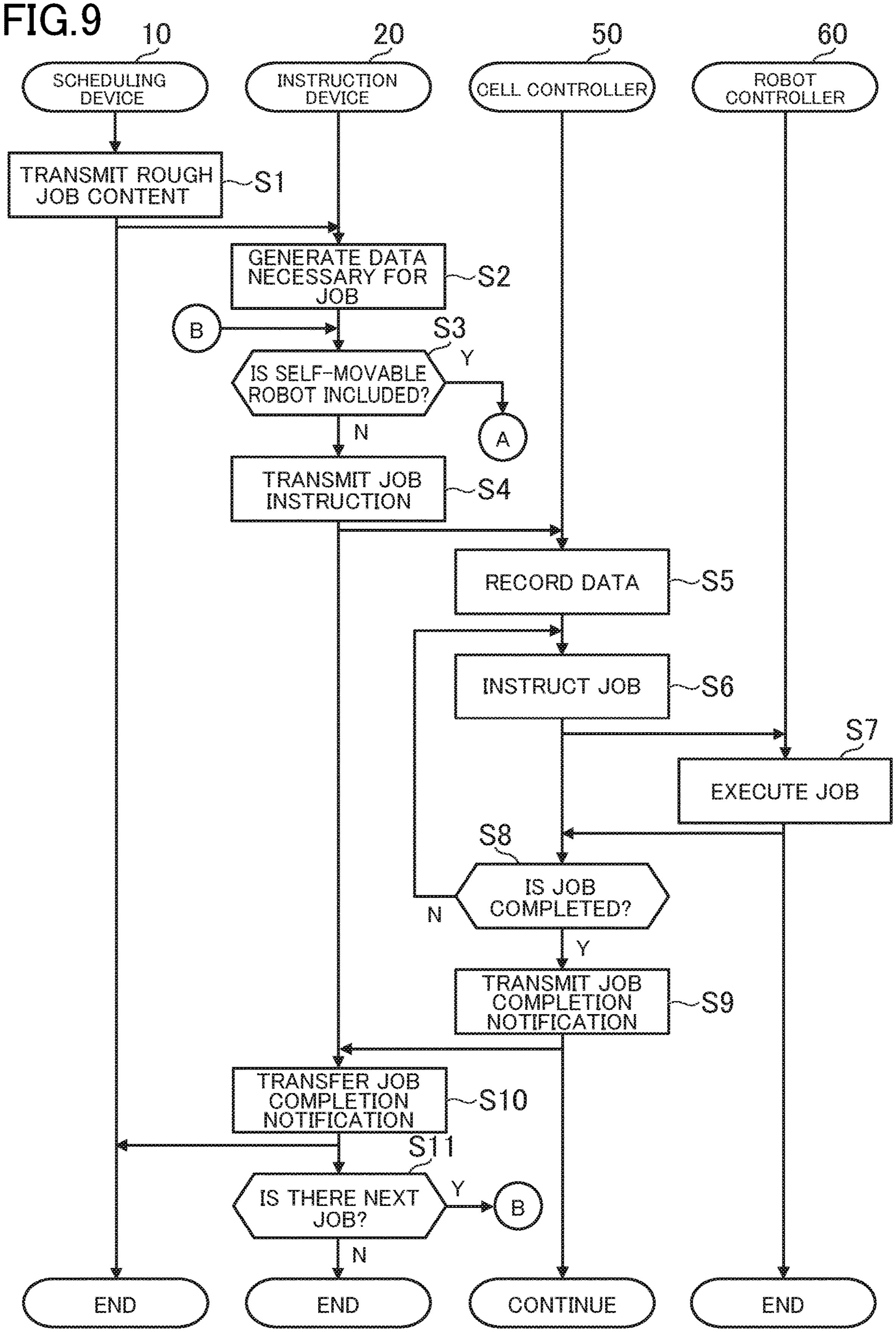
FIG. 9 is a flow chart showing processing executed in the production system.
Figure 11:
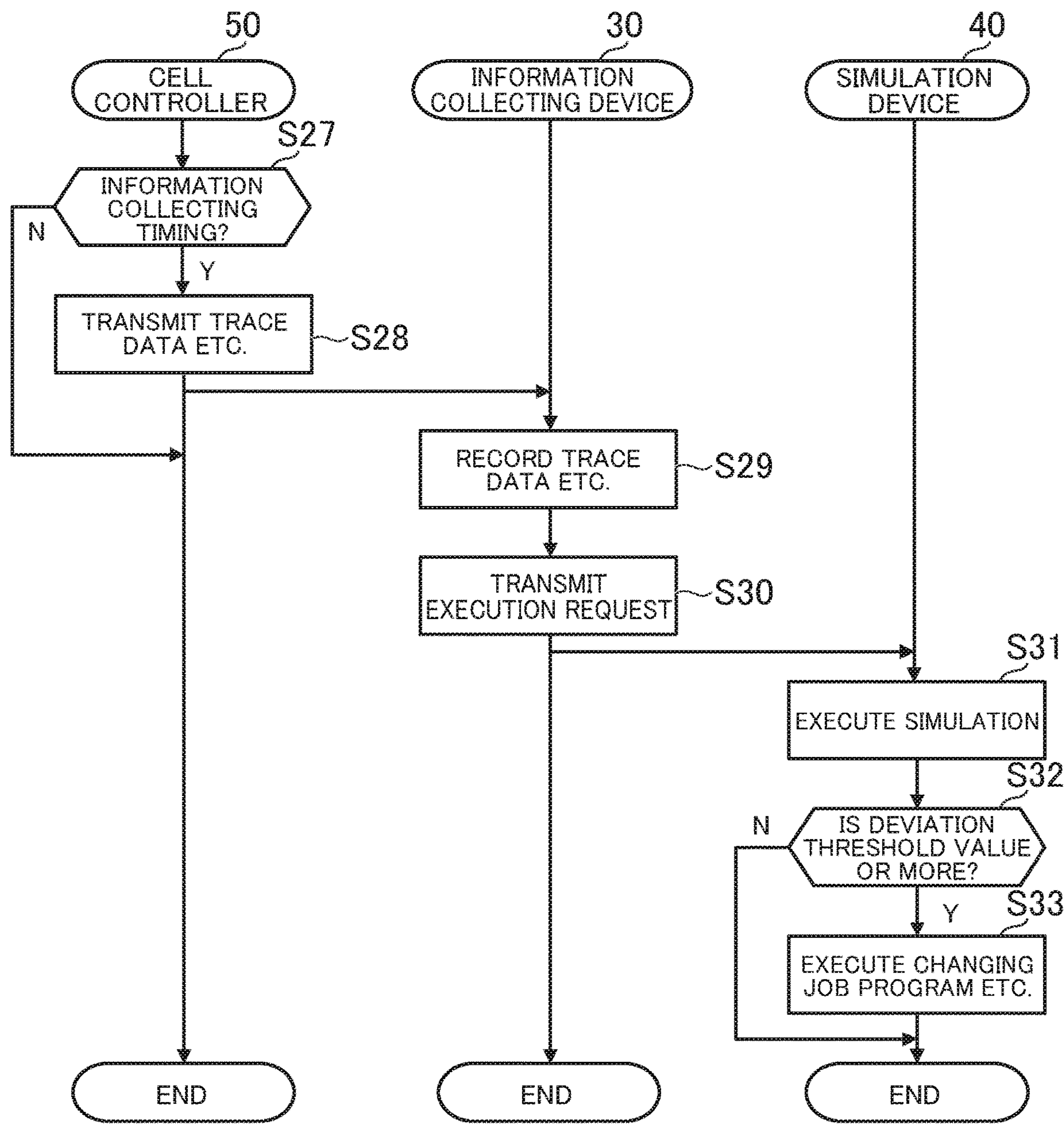
FIG. 11 is a flow chart showing processing executed in the production system.

FIGS. 9 to 11 are flow charts showing processing executed in the production system S. The processing shown in FIGS. 9 to 11 is executed by the CPUs 11, 21, 31, 41, 51, 61, 83, and 91 operating in accordance with the programs respectively stored in the storage units 12, 22, 32, 42, 52, 62, 72, 84, and 92. The processing described below is an example of processing executed by the functional block shown in FIG. 4.

As shown in FIG. 9, the scheduling device 10 transmits rough content of a job in the production plan to the instruction device 20 based on the schedule data stored in the storage unit 12 (S1). In S1, the scheduling device 10 transmits the cell ID, the industrial device ID, and the job content stored in the schedule data as the rough job content. The rough job content transmitted by the scheduling device 10 does not need to include the industrial device ID.

Upon receiving the rough job content, the instruction device 20 generates data necessary for the job (S2). In S2, the instruction device 20 generates the data to be used by at least one of the cell controller 50, the robot controller 60, and the self-movable robot 80. In the present embodiment, such data is a job program and setting data. Assume that the algorithm for generating the data is stored in the storage unit 22 in advance. The data generation algorithm defines the relationship between the job content and the data generation method.

In S3, the instruction device 20 specifies a destination to transmit the data generated in S2 and determines whether the self-movable robot 80 is included in the destination. This destination is the entity performing the next job. In this embodiment, a case will be described in which the industrial device indicated by the industrial device ID included in the rough job content received in S2 is the destination, although the instruction device 20 may determine the destination to transmit the data by itself. For example, in a case where the industrial device ID is not included in the rough job content transmitted from the scheduling device 10, the instruction device 20 may specify an appropriate industrial device based on the job content and determine the industrial device as a destination to transmit the data.

When it is determined that the self-movable robot 80 is not included in the destination to transmit the data (S3;N), the instruction device 20 transmits a job instruction including the data generated in S2 to the cell controller 50 (S4). The job instruction instructs the start of the job, and is performed by transmitting data in a predetermined format.

Upon receiving the job instruction from the instruction device 20, the cell controller 50 records the data included in the job instruction in the storage unit 52 (S5), and instructs the robot controller 60 of its cell to perform the job (S6). In S6, the robot controller 60 controls the robot 70 in response to the instruction from the cell controller 50. Assume that the job program and the setting data are developed in each robot controller 60 between the cell controller 50 and the robot controller 60, and processing such as IP address exchange is executed in advance.

The robot controller 60 executes the job based on the instruction from the cell controller 50 (S7). In S7, the robot controller 60 transmits the execution result of the job as a response to the cell controller 50. Further, the robot controller 60 may transmit trace data based on the detection signal of the sensor 71 connected to the robot controller 60. The cell controller 50 also receives a response from the robot controller 60. The cell controller 50 also records the received trace data and the image or video captured by the camera 72 in the storage unit 52. Assume that the data in the cell are synchronized and the time axes of the data are aligned with each other.

The cell controller 50 determines whether the job instructed by the instruction device 20 is completed (S8). If it is not determined that the job is completed (S8; N), the processing returns to S6 and the job is continued. If it is determined that the job is completed (S8; Y), the cell controller 50 transmits a job completion notification to the instruction device 20 (S9).

Upon receiving the job completion notification from the cell controller 50, the instruction device 20 transfers the job completion notification to the scheduling device 10 (S10). The processing of S10 may be omitted. The instruction device 20 may notify the scheduling device 10 when a predetermined number of jobs are completed. The instruction device 20 determines whether there is next job based on the rough job content received from the scheduling device 10 or the data generated in S2 (S11). If it is determined that there is the next job (S11;Y), the processing proceeds to S3, and the destination of the data of the next job is referred.

In S3, if it is determined that the self-movable robot 80 is included in the destination of the data of the instruction device 20 (S3;Y), proceeding to FIG. 10, the instruction device 20 transmits a job instruction including the data generated in S2 to the cell controller 50 (S12), and transmits a movement instruction to the self-movable robot 80 (S13). The processing of S12 is the same as the processing of S4. The movement instruction transmitted in S13 is an instruction to move to the next location, and is performed by transmitting data in a predetermined format. Assume that the movement instruction includes information for identifying the location of the movement destination. As described above, the movement destination is a position in the vicinity of the communication device 73 of the next cell.

The processing of S14 executed by the cell controller 50 is the same as the processing of S5. The cell controller 50 determines whether the self-movable robot 80 has arrived at its cell (S15). When it is not determined that the self-movable robot 80 has arrived (S15;N), the processing returns to S15 again, and the arrival of the self-movable robot 80 is waited for.

Upon receiving the movement instruction, the self-movable robot 80 uses the AGV controller 90 to generate a movement path to the destination included in the movement instruction (S16). In S16, the self-movable robot 80 may generate a movement path based on a known path search algorithm. The movement path is generated so as not to interfere with the fixed robot 70 or other self-movable robot 80 from the current position of the self-movable robot 80 toward the destination.

The self-movable robot 80 controls the movement toward the next cell, which is the destination, based on the movement path generated in S16 (S17). In S17, the self-movable robot 80 analyzes the surrounding state based on the detection signal of the sensor 94 and the image or video captured by the camera 95. The self-movable robot 80 moves on the movement path by rotating the motor 96 based on the analysis result.

While moving toward the next cell, the self-movable robot 80 downloads the data generated in S2 using the wireless communication unit 85A from the instruction device 20 (S18). If the download is completed during the movement, the processing of S18 is not executed.

The self-movable robot 80 determines whether the self-movable robot 80 has arrived at the next cell, which is the destination, based on at least one of communication content of the wireless communication unit 85A, a detection signal of the sensor 94, and an image or video captured by the camera 95 (S19). For example, a predetermined mark may be arranged in the vicinity of the communication device 73, and when the self-movable robot 80 detects the mark, the self-movable robot 80 may be determined to have arrived at the next cell. If it is not determined that the self-movable robot 80 has arrived at the next cell (S19; N), the processing returns to S17, and the movement control by the self-movable robot 80 is continued.

If it is determined that self-movable robot 80 has arrived at the next cell (S19;Y), the self-movable robot 80 provides a wired connection between the communication device 73 of the cell and the wired communication unit 85B of the self-movable robot 80 (S20). In S20, the self-movable robot 80 identifies the position of the communication device 73 and connects its own wired communication unit 85B based on at least one of communication content of the wireless communication unit 85A, a detected signal of the sensor 94, and an image or video captured by the camera 95. In the case of the contact-type communication device 73, when the wired communication unit 85B is in contact with the communication device 73, these devices are connected by wired communication. The self-movable robot 80 establishes the wired communication with the cell controller 50 via the communication device 73, and executes initial setting for performing the job in the cell at which the self-movable robot 80 arrives. As in the embodiment 2 described later, the self-movable robot 80 is capable of performing the job synchronously with the robot 70 of this cell.

When the wired communication with the self-movable robot 80 is established, if it is determined in S15 that the self-movable robot 80 has arrived (S15;Y), the cell controller 50 instructs the job to each of the robot controller 60 and the self-movable robot (S21). Communication is then performed between the cell controller 50, the robot controller 60, and the self-movable robot 80, and the job instructed from the instruction device 20 is executed (S22). The processing of S22 is the same as the processing of S7. In the processing of S22, the robot controller 82 of the self-movable robot 80 is handled in the same way as the robot controller 60.

The cell controller 50 determines whether the job instructed by the instruction device 20 is completed (S23). If it is not determined that the job is completed (S23;N), the processing returns to S21, and the job is continued. If it is determined that the operation is completed (S23;Y), the cell controller 50 transmits an instruction to the self-movable robot 80 to leave its cell (S24). The leaving instruction is an instruction to leave a cell, and is performed by transmitting data in a predetermined format. Subsequently, the cell controller 50 proceeds to the processing of S9 shown in FIG. 9, and transmits a job completion notification to the instruction device 20.

Upon receiving the leaving instruction, the self-movable robot 80 disconnects the wired connection between the communication device 73 and its wired communication unit 85B (S25), and switches to a wireless connection using its wireless communication unit 85A (S26). In S26, the self-movable robot 80 specifies the position of the communication device 73 based on a detected signal of the sensor 94 and an image or video captured by the camera 95, and disconnects its wired communication unit 85B. In the case of the contact-type communication device 73, the connection is disconnected by detaching the wired communication unit 85B from the communication device 73.

Referring to FIG. 11, the cell controller 50 determines whether the information collection timing has arrived (S27). The information collection timing is a timing at which information such as trace data is provided to the information collecting device 30. When it is not determined that the information collection timing has arrived (S27;N), the information such as the trace data is not transmitted. If it is determined that the information collection timing has arrived (S27;Y), the cell controller 50 transmits the information such as the trace data recorded in the storage unit 52 to the information collecting device 30 (S28).

Upon receiving the information such as the trace data, the information collecting device 30 records the data in the storage unit 32 (S29), and transmits a request to execute a simulation to the simulation device 40 (S30). The execution request is a request for executing a simulation based on the information recorded in the storage unit 32, and is performed by transmitting data in a predetermined format. The execution request includes the trace data to be simulated and content of the instruction at that time.

Upon receiving the execution request, the simulation device 40 executes a simulation (S31). In S31, the simulation device 40 inputs the instruction from the instruction device 20 to a simulator, and obtains a simulation result.

The simulation device 40 compares the simulation result with the actual job result indicated by the trace data, and determines whether the deviation between the results is equal to or greater than a threshold value (S32). If it is determined that the deviation is equal to or larger than the threshold value (S32;Y), the information collecting device 30 executes processing such as changing the job program (S33).

The processing described above is executed until there is no schedule for the next job. In S11 shown in FIG. 9, if it is not determined that there is a schedule for the next job (S11;N), all the job for the day has been completed, and this processing terminates.

The production system S of the embodiment 1 enables the self-movable robot 80 to start preparing for the next job before arriving at the next location, which serves to start the next job promptly and to improve the production efficiency in the production system S. For example, if the self-movable robot 80 arrives at a next location and then starts preparation for the next job, the robot controller 60 at the next location needs to wait until the preparation is completed. The production system S of the embodiment 1 eliminates or shortens such waiting time, thereby improving the production efficiency.

Further, in the production system S, the self-movable robot 80 is controlled to prepare for the next job while moving toward the next location, thereby preparing for the job at an earlier stage to effectively increase the production efficiency in the production system S.

Further, in the production system S, the self-movable robot 80 is controlled to download data to be used in the next job as a preparation for the next location. As such, even if the data to be used in the next job is not recorded in the self-movable robot 80, the data can be downloaded at an earlier stage and the production efficiency in the production system S can be improved. Further, if the data of all the job performed by the self-movable robot 80 for the day is recorded in advance, the memory consumption increases, but the memory consumption can be reduced by downloading the data before the self-movable robot 80 arrives at the next location.

Further, in the production system S, while the self-movable robot 80 is moving toward the next location, the self-movable robot 80 provides wireless communication, and when the self-movable robot 80 arrives at the next location, the self-movable robot 80 provides wired communication through the communication device 73 for wired communication. This enables to provide a communication in a manner suitable to the situation at that time. For example, when the self-movable robot 80 performs the job in the next location, the job can be performed by stable wired communication. Further, for example, while moving toward the next location, the self-movable robot 80 can use wireless communication so as to prepare for the job at the next location. Further, for example, when the self-movable robot 80 uses wired communication while moving toward the next location, a cable may interfere with the movement, but switching to wireless communication during the movement can reduce the possibility that the movement of the self-movable robot 80 is interfered. Further, for example, by switching to the wired communication when the self-movable robot 80 starts the job, the time axis of the trace data can be aligned with other devices such as the cell controller 50. In this way, it is possible to identify a point in time of individual states indicated by the trace data of the self-movable robot 80.

Further, in the production system S, before the self-movable robot 80 having the AGV unit 89 and the robot 86 arrives at the next location, the self-movable robot 80 is controlled to prepare for the next job. This can improve the production efficiency in the production system S.

2. Embodiment 2

Next, another embodiment (hereinafter, embodiment 2) of the production system S will be described. As described in the embodiment 1, in the next cell to which the self-movable robot 80 is moved, the fixed robot 70 belonging to such a cell is disposed. In the job of the next location, if the self-movable robot 80 and the robot controller 60 are not operated in synchronization with each other, they may hinder the job by coming into contact with each other, for example. For this reason, the production system S of the embodiment 2 synchronizes the self-movable robot 80 and the robot controller 60 when the self-movable robots 80 arrives at the next location.

FIG. 12 is a functional block diagram of the embodiment 2. As shown in FIG. 12, in the embodiment 2, a synchronization control unit 805 is implemented in the self-movable robot 80 in addition to the functions described in the embodiment 1. For example, the synchronization control unit 805 is implemented mainly by the CPU 83 of the robot controller 82. The synchronization control unit 805 synchronizes the self-movable robot 80 and the robot controller 60 when the self-movable robot 80 arrives at the next location.

The synchronization is coordination between an operation of one industrial device and an operation of another industrial device. In other words, the synchronization is that an industrial device detects a state of another industrial device and operates in accordance with the state of another industrial device. The synchronization is also referred to as synchronous control, and may be implemented by synchronous communication. To wait until another industrial device becomes a predetermined state also corresponds to the synchronization.

The synchronization control unit 805 operates the self-movable robot 80 in response to the operation of the fixed robot 70. For example, the synchronization control unit 805 operates the self-movable robot 80 so as to be a predetermined distance from the fixed robot 70 (so as not to contact the robot 70). For example, the synchronization control unit 805 operates the self-movable robot 80 such that, when the fixed robot 70 holds a job object, the robot hand of the self-movable robot 80 approaches the job object. For example, the synchronization control unit 805 operates the self-movable robot 80 such that, when the self-movable robot 80 holds a job object, the job object approaches the fixed robot 70.

For example, the synchronization control unit 805 includes an obtainment control unit 805A. When the self-movable robot 80 arrives at the next location, the obtainment control unit 805A controls the self-movable robot 80 to obtain at least one of information on a state of the robot 70 controlled by the robot controller 60, information on a state of a job object at the next location, and detected information of a peripheral device at the next location.

The Information on the state of the robot 70 is information about at least one of the position, posture, orientation, and speed of the robot 70. The job executed by the robot controller 60 that controls the robot 70 is also an example of information on the state of the robot 70. For example, information detected by the sensor 71 or the camera 72 (sensing data, image, video) is also an example of information on the state of the robot 70.

The information on the state of the job object is information about at least one of the shape, position, posture, orientation, and speed of the job object. This information is detected by the sensor 71 or the camera 72. The peripheral device is a device other than the robot controller 60 and the robot 70, and is, for example, at least one of the sensor 71 and the camera 72. For example, the detection information of the peripheral device is a physical quantity detected by a temperature sensor or a torque sensor.

The information described above is information necessary for synchronization. The obtainment control unit 805A may controls the self-movable robot 80 to obtain all of these pieces of information, or only one or two of these pieces of information. In this embodiment, the cell controller 50 transmits such information, although other devices, such as the information collecting device 30, may transmit such information. The robot controller 60 also obtains information necessary for synchronization.

Assume that a program indicating the actions of the self-movable robots 80 corresponding to the above-described information is stored in the storage unit 84. The program is necessary for the synchronization with the robot 70. The program may be obtained using the wireless communication while moving, or using the wired communication after arriving at the cell. The self-movable robot 80 acts according to the obtained information based on the program, thereby synchronizing with the robot 70.

For example, when a robot arm of the robot 86 of the self-movable robot 80 is in the vicinity of a robot arm of the other robot 70, the self-movable robot 80 controls the robot 86 so as to move away from the robot arm of the robot 70. For example, if the job object does not reach a predetermined state, the self-movable robot 80 waits until the job of the other robots 70 is completed. For example, the self-movable robot 80 may change its job according to the physical quantity detected by the sensor 71. Further, for example, the self-movable robot 80 may change its job in accordance with the state of the job object detected by the camera 72 or the state of the other robots 70.

According to the production system S of the embodiment 2, when the self-movable robot 80 arrives at the next location, the self-movable robot 80 and the robot controller 60 are synchronized, and the self-movable robot 80 is thereby synchronized with the robot controller 60. This increases the production efficiency of the production system S. Further, the self-movable robot 80 and the robot controller 60 are synchronized, and this prevents them from interfering with each other by making a contact with each other during the job, for example.

Further, in the production system S, when the self-movable robot 80 arrives at the next location, the self-movable robot 80 obtains information about at least one of the state of the robot controller 60, the state of the job object at the next location, and the information detected by the peripheral device at the next location. This can improve the production efficiency of the production system S. For example, the state of the robot controller 60 is provided to the self-movable robot 80, which prevents the self-movable robot 80 from becoming an obstacle to the job of the robot controller 60. Further, for example, the state of the job object in the next location is provided to the self-movable robot 80, which serves to increase the job accuracy of the self-movable robot 80 in the next location. Further, for example, the detection information of the peripheral device in the next place is provided to the self-movable robot 80, which serves to improve the job efficiency in the next location.

The production system S of the embodiment 2 may not have the functions of the embodiment 1. For example, the production system S may synchronize the self-movable robot 80 with the other robots 70 in the cell when the self-movable robot 80 arrives at the next cell without making the self-movable robot 80 to prepare during the movement as described in the embodiment 1. In this case, the self-movable robot 80 may prepare for the job in the next cell after arriving at the next cell.

3. Modification Examples

The present invention is not to be limited to the above described embodiments. The present invention can be changed as appropriate without departing from the spirit of the invention.

FIG. 13 is a functional block diagram of a modification example. As shown in FIG. 13, in the modification example described below, a before/after preparation control unit 503, a second preparation control unit 803C, a third preparation control unit 803D, amounting control unit 803E, a fourth preparation control unit 803F, a second job control unit 804B, a determining unit 806, a setting unit 807, and a transmission control unit 808 are implemented in addition to the functions described in embodiment 1. In FIG. 13, the synchronization control unit 805 described in the embodiment 2 is omitted, although the synchronization control unit 805 may also be implemented in the following modification examples.

(1) For example, the timing at which the self-movable robot 80 prepares for the next job is not limited to the time during the movement as described in the embodiments 1 and 2. In the examples of FIGS. 3 to 6, the preparation for the job in the next cell X may be started when the self-movable robot 80 completes the job in the cell Y.

In the production system S of the present modification example, the determining unit 806 is implemented. The determining unit 806 is mainly implemented by the CPU 83. The determining unit 806 determines whether the current job of the self-movable robot 80 is completed. The current job is the job in the cell where the self-movable robot 80 is currently positioned. The current job may be the job performed by the self-movable robot 80 in this cell, or the job of the entire cell. For example, in a case where the cell controller 50 transmits a predetermined job completion notification to the self-movable robot 80 when the current job is completed, the determining unit 806 determines whether the job completion notification is received. To receive the job completion notification means that the current job is completed.

The preparation control unit 803 of the present modification example includes the second preparation control unit 803C. When it is determined that the current job is completed, the second preparation control unit 803C controls the self-movable robot 80 to prepare for the next job. The second preparation control unit 803C controls the self-movable robot 80 to prepare for the next job on condition that the current job is completed. The second preparation control unit 803C controls the self-movable robot 80 not to prepare for the next job when the current job is not completed, and allows the self-movable robot 80 to prepare for the next job when the current job is completed. The method of preparation by the self-movable robots 80 is as described in the embodiment 1.

According to the modification example (1), when it is determined that the current job of the self-movable robot 80 is completed, the preparation of the next job is started at an earlier stage. This effectively increases the production efficiency in the production system S.

(2) Further, for example, in the examples of FIGS. 3 to 6, when the self-movable robot 80 completes the job in the cell Y and is instructed to move toward the next cell X, the preparation of the next job may be started.

The preparation control unit 803 of this modification example includes the third preparation control unit 803D. The third preparation control unit 803D controls the self-movable robot 80 to prepare for the next job when the self-movable robot 80 is instructed to move to the next location. The third preparation control unit 803D controls the self-movable robot 80 to prepare for the next job on condition that the self-movable robot 80 is instructed to move to the next location. The third preparation control unit 803D controls the self-movable robot 80 not to prepare for the next job when the movement to the next location is not instructed, and allows the self-movable robot 80 to prepare for the next job when the movement to the next location is instructed. The method of preparation by the self-movable robots 80 is as described in the embodiment 1.

According to the modification example (2), when the movement to the next location is instructed, the self-movable robots 80 is allowed to prepare for the next job. This enables preparing for the job at an earlier stage, and effectively increasing the production efficiency in the production system S.

(3) For example, in the embodiments 1 and 2, downloading of data has been described as an example of preparation of the self-movable robots 80, although the preparation may be physical preparation as described above. For example, when the robot hand of the robot 86 of the self-movable robot 80 is detachable, the robot hand may be replaced with a robot hand required in the next job as a preparation for the next job.

The preparation control unit 803 of the modification example includes the mounting control unit 803E. The mounting control unit 803E controls the self-movable robot 80 to mount a device to be used in the next job for preparation for the next location. The device may be any device that can be mounted on the self-movable robot 80 and can be used in the job. For example, the device is a so-called end effector. The device may be any type of device and is not limited to a robot hand. For example, the device may be a tool such as a soldering iron, a machine tool, a sensor, or a camera.

The mounting itself of the device may be implemented by various methods. For example, the mounting control unit 803E may detect a device to be mounted by the sensor 87 or the camera 88, and mount the device at a predetermined position, such as the distal end of the robot 86. The device may be disposed on the cart of the self-movable robot 80, for example, or at a predetermined location in the facility to be picked up by the self-movable robot 80. For example, the mounting control unit 803E removes the device currently mounted on the robot 86, and mounts a device to be used in a subsequent operation on the robot 86. The removed device may be disposed on the cart of the self-movable robot 80, for example, or disposed at a predetermined location to which the self-movable robot 80 is moved.

The job control unit 804 of this modification example includes the second job control unit 804B. The second job control unit 804B controls the self-movable robot 80 to perform the next job when the self-movable robot 80 arrives at the next location and the device is mounted already. The second job control unit 804B controls the self-movable robot 80 to perform the next job on condition that the self-movable robot 80 arrives at the next location and the device is mounted already. This modification example is different from the embodiments 1 and 2 only in that the mounted device can be used, and the method of controlling the job is as described in the embodiments 1 and 2.

According to the modification example (3), the self-movable robot 80 is provided with a device to be used in the next job as the preparation for the next location. As such, even if the self-movable robot 80 is not equipped with the device to be used in the next job, the self-movable robot 80 is provided with the device at an earlier stage, which serves to improve the production efficiency in the production system S.

(4) For example, before the self-movable robot 80 arrives at the next location, the robot controller 60 and the fixed robots 70 at such a location may prepare for the job. If the example of FIGS. 3 to 6, before the self-movable robot 80 arrives at the cell Y, the robot controller 60 of the cell Y and the fixed robots 70D and 70E may prepare for the job. Similarly, before the self-movable robot 80 arrives at the cell X, the robot controller 60 of the cell X and the fixed robots 70A to 70C may prepare for the job.

The preparation control unit 803 of the present modification example includes the before/after preparation control unit 503. The before/after preparation control unit 503 is implemented mainly by the CPU 51. The before/after preparation control unit 503 controls the robot controller 60 to prepare for the job to be performed before or after the next job before the self-movable robot 80 arrives at the next location. The job to be performed before or after the next job is a pre-step or a post-step of the job to be performed by the self-movable robot 80 at the next location. In other words, the job to be performed before or after the next job is the job performed by the fixed robot 70 in cooperation with the self-movable robot 80.

The meaning of "before arriving at the next location" and the preparation are the same as described in the embodiment 1. For example, in a case where the robot controller 60 prepares for the job electronically, the before/after preparation control unit 503 transmits the required data in the job before or after the next job to the robot controller 60. Further, for example, in a case where the robot controller 60 prepares for the job physically, the before/after preparation control unit 503 controls to replace the device such as a robot arm of the robot 70. These preparations are the same as those of the self-movable robot 80.

According to the modification example (4), before the self-movable robot 80 arrives at the next location, the robot controller 60 in that location is controlled to prepare for the job, and the next job can be thereby started quickly. This improves the production efficiency in the production system S. For example, if the robot controller 60 starts preparation for the job after the self-movable robot 80 arrives at the next location, the job cannot be started until all the preparations of the self-movable robot 80 are completed. By eliminating or shortening such waiting time, it is possible to improve the production efficiency.

(5) Further, for example, when the self-movable robot 80 arrives at the next location, there is a possibility that the self-movable robot 80 does not stop at the position or the orientation as expected. In this case, if the self-movable robot 80 tries to perform the next job based on the downloaded data, a slight difference may occur and hinder the next job. As such, calibration for correcting the difference may be performed based on the state when the self-movable robot 80 arrives at the next location.

In the production system S of the present modification example, the setting unit 807 is implemented. The setting unit 807 is mainly implemented by the CPU 83 of the robot controller 82. When the self-movable robot 80 arrives at the next location, the setting unit 807 sets the next job based on at least one of the current position and the orientation of the self-movable robot 80. In the present modification example, both the position and the orientation are used, although only one of them may be used.

For example, a reference mark is arranged in the vicinity of the communication device 73 in the cell. The setting unit 807 detects the mark by the camera 88 and specifies the relative position to the mark and a deviation of the orientation to the mark (deviation from the position and the orientation that the self-movable robot 80 should originally be at and directed to). The setting data is generated so that there is no deviation in position and orientation, and thus the setting unit 807 corrects the setting data by the specified deviation. For example, the setting unit 807 performs reference alignment of the coordinate system for control based on the deviation. Further, for example, the setting unit 807 corrects the teaching data indicated by the setting data by the specified deviation to absorb the deviation.

According to the modified example (5), when the self-movable robot 80 arrives at the next location, the setting of the next job is performed based on at least one of the current position and the orientation of the self-movable robot 80. This increases the job accuracy. For example, it is conceivable to move the self-movable robot 80 so as to eliminate the deviation of the position and the orientation of the self-movable robot 80, but it takes time to move the self-movable robot 80. As such, if the deviation is corrected by calibration, the job can be started earlier.

(6) Further, for example, the timing at which the self-movable robot 80 prepares for the next job may be the time when the movement to the next location is instructed by the instruction device 20. As described in the embodiments 1 and 2, the instruction device 20 is communicably connected to the scheduling device 10 for scheduling a production plan, and provides instructions of each job based on the scheduling. The production plan is an overall plan in the production system S. For example, the production plan may indicate at least one of a product to be produced, the number of products, and a job period. The production plan is the content shown in the schedule data.

In this modification example as well, the transmitting unit 502 of the cell controller 50 transmits a predetermined job completion notification to the instruction device 20 when the current job of the robots 70 and 84 is completed. Upon receiving the job completion notification, the receiving unit 202 of the instruction device 20 instructs the self-movable robot 80 to move to the next location. These procedures are as described with reference to FIGS. 9 and 10.

The preparation control unit 803 of the present modification example includes the fourth preparation control unit 803F. The fourth preparation control unit 803F controls the self-movable robot 80 to prepare for the next job when the instruction device 20 instructs the self-movable robot 80 to move to the next location. The fourth preparation control unit 803F controls the self-movable robot 80 to prepare for the next job on condition that the self-movable robot 80 is instructed to move to the next location. The fourth preparation control unit 803F controls the self-movable robot 80 not to prepare for the next job when the movement to the next location is not instructed, and allows the self-movable robot 80 to prepare for the next job when the movement to the next location is instructed. The methods of preparation of the self-movable robots 80 are as described in the embodiments 1 and 2.

According to the modification example (6), the scheduling device 10 schedules a production plan and the instruction device 20 gives a specific job instruction. As such, the roles of the respective devices are shared in the production system S, and this improves the efficiency of the production system S.

(7) For example, when the self-movable robot 80 arrives at the next location, the self-movable robot 80 may be made to transmit information about itself to the information collecting device 30.

The production system S of this modification example includes the transmission control unit 808. The transmission control unit 808 is mainly implemented by the CPU 83 of the robot controller 82. When the self-movable robot 80 arrives at the next location, the transmission control unit 808 controls the self-movable robot 80 to transmit information relating to the self-movable robot 80 to the information collecting device 30. The transmission control unit 808 controls the self-movable robot 80 to transmit information on the self-movable robot 80 to the information collecting device 30 on condition that the self-movable robot 80 arrives at the next location. As described in the embodiments 1 and 2, when the self-movable robot arrives at the next location, the communication is switched to wired communication, and thus the transmission control unit 808 controls the self-movable robot 80 to transmit the information about the self-movable robot 80 by using the wired communication.

The information relating to the self-movable robot 80 may be any information, for example, a name or an IP address of the self-movable robot 80, a function of the self-movable robot 80, trace data stored in the self-movable robot 80, information detected by the sensors 87 and 94, an image or video captured by the cameras 88 and 95, or the current state of the self-movable robot 80. The current state is, for example, a position, posture, remaining battery capacity of the self-movable robot 80. The information transmitted to the information collecting device 30 is not limited to these examples, and any information may be transmitted.

According to the modified example (7), when the self-movable robot 80 arrives at the next location, the self-movable robot 80 is controlled to transmit information relating to the self-movable robot 80 to the information collecting device, and thus, it is possible to utilize the information, for example, to analyze the operation state of the self-movable robot 80 and increase the production efficiency.

(8) Further, for example, the above modification examples may be combined.

Further, for example, the self-movable robot 80 may have a function of switching communication without having the functions described in the embodiments 1 and 2. That is, the self-movable robot 80 may perform wireless communication during the movement and may switch to wired communication after arriving at the next cell without performing preparation for the next cell during the movement and synchronization after arriving at the next cell. For example, the self-movable robot 80 may transmit the trace data to the information collecting device 30 by the wireless communication while moving, and may switch to the wired communication when arriving at the next cell.

Further, for example, the case where the instruction device 20 issues the movement instruction has been described, although the movement instruction may be issued by another computer. For example, in a case where a movement plan of the day is recorded in advance in the AGV controller 90, the self-movable robot 80 may determine the timing to move to the cell based on the movement plan.

For example, the case has been described in which each of the robot unit 81 and the AGV unit 89 of the self-movable robot 80 is provided with a communication function, but only one of them may be provided with a communication function. For example, only the robot unit 81 may have a communication function, and the AGV unit 89 may receive a movement instruction via the robot unit 81. For example, only the AGV unit 89 may have a communication function, and the robot unit 81 may receive a movement instruction via the AGV unit 89.

Further, for example, if sufficiently reliable wireless communication can be used, the self-movable robot 80 may not have a function of switching between the wireless communication and the wired communication. For example, the self-movable robot 80 may communicate with the cell controller 50 by wireless communication to perform the next job. In this case, the self-movable robot 80 may always perform wireless communication without having a function of wired communication. In contrast, if a communication cable does not interfere with the movement of the self-movable robot 80, the self-movable robot 80 may prepare for the next cell by the wired communication. In this case, the self-movable robot 80 may always perform wired communication without having a function of wireless communication.

Further, for example, the case where the self-movable robot 80 can freely move to any cell has been described, although a cell to be handled by the self-movable robot 80 may be determined. For example, one self-movable robot 80 may be in charge of cells X and Y, and other self-movable robot 80 may be in charge of other cells. For example, the self-movable robot 80 may move within one cell. In this case, when completing the job of one cell, the self-movable robot 80 moves to a location in the cell where a post-process of the job is performed, and executes the post-process. At this time, preparation for the post-process may be made during the movement by the processing described in the embodiment 1, or synchronization may be performed after the movement by the processing described in the embodiment 2.

Further, for example, the processing of the production system S has been described by taking the example of the multi-type small-volume production, although the production system S may be applied to any other case. For example, the production system S may be applied to a one-type high-volume production. In this case, by executing the same processing as that described above, the self-movable robot 80 may move between the cells to perform the job. For example, if a failure occurs in a fixed robot 70 in a cell, the self-movable robot 80 may move to such a cell in order to execute the job instead of the robot 70.

Further, for example, the case where the fixed robot 70 is disposed in the cell has been described, although the robot 70 disposed in the cell may move around in some degree. For example, the robot 70 may move on rails provided in the cell.

Further, for example, in the processing of S1 in FIG. 9, the scheduling device 10 transmits the schedule of the day to the instruction device 20, although the scheduling device 10 may transmit only a part of the schedule of the day to the instruction device 20. In this case, when confirming that the part of the schedule is completed, the instruction device 20 notifies the scheduling device 10 of such information. Upon receiving the notification, the scheduling device 10 refers to the schedule data and checks whether there is a next schedule. When it is determined that there is a next schedule, the scheduling device 10 transmits the rough job content of the next schedule to the instruction device 20. Thereafter, the processing of S2 and subsequent steps in FIG. 9 is executed, and the job of the next schedule is performed. When it is determined that there is no next schedule, which means all the job for the day is completed, and thus the scheduling device 10 may terminate the processing. For example, the instruction device 20 may transmit a job completion notification to the scheduling device 10 for each job, and may receive a schedule of the next job.

For example, the production system S may have a cell configured of only the self-movable robots 80. In this case, a plurality of self-movable robots 80 gather and execute the job together. For example, each of the self-movable robots 80 performs the processing described in the embodiment 1 and prepares for the job to be performed in the cell prior to reaching the job space allocated to the cell. Further, for example, each of the self-movable robots 80 executes the processing described in the embodiment 2, and when arriving at the cell, synchronizes with other self-movable robots 80. The cell controller 50 may be disposed in the job space of the cell, or may not be disposed in the job space of the cell. Similarly, the communication device 73 may be disposed in the job space, or may not be disposed in the job space. When the job in this cell is completed, each of the self-movable robots 80 proceeds to the next job, and thus the cell disappears. Furthermore, this cell may be configured of only one self-movable robot 80.

For example, the case has been described in which the main functions are implemented by the self-movable robot 80, although the functions described as being implemented by the self-movable robot 80 may be implemented by another device. For example, the movement control unit 801, the communication control unit 802, and the preparation control unit 803 may each be implemented by the instruction device 20 or another device. Further, for example, the job control unit 804 may be implemented by the cell controller 50 or another device. Further, for example, the synchronization control unit 805 may be implemented by the cell controllers 50 or other devices. The other functions may be similarly implemented by any device in the production system S. Further, for example, the data described as being stored in the production system S may be obtained from other system. Further, for example, the configuration of the production system S is not limited to the example of FIG. 1. The production system S may include at least one self-movable robot 80.

The embodiments described above have been shown as a specific example, and the present invention disclosed in this specification is not limited to the configurations of these specific examples and the data storage example itself. Those skilled in the art may make various modifications to the disclosed embodiment with regard to, for example, the shapes and numbers of physical components, data structures, and execution orders of processing. It is to be understood that the technical scope of the invention disclosed herein encompasses such modifications. In other words, it should be understood by those skilled in the art that various modifications, combinations, sub-combinations and alterations may occur depending on design requirements and other factors insofar as they are within the scope of the appended claims or equivalents thereof.

What is claimed is:

1. A production system comprising:

an industrial device being self-movable; and circuitry configured to:

control the industrial device to start to move towards a next location when the industrial device receives a movement instruction, control the industrial device to download a job program and a parameter of a next job while the industrial device is moving towards the next location; and control the industrial device to perform the next job based on the job program and the parameter when the industrial device arrives at the next location and downloading the job program and the parameter is completed.

2. The production system according to claim 1, wherein the circuitry is configured to:

determine whether a current job of the industrial device is completed; and control the industrial device to prepare for the next job if it is determined that the current job is completed.

3. The production system according to claim 2, wherein the circuitry is configured to:

instruct the industrial device to move to the next location.

4. The production system according to claim 2, wherein the performance of the next job is different than performance of the current job.

5. The production system according to claim 4, wherein the circuitry is configured to execute the job program and use the parameter that includes a teaching data of the industrial device.

6. The production system according to claim 1, wherein the circuitry is configured to:

instruct the industrial device to move to the next location.

7. The production system according to claim 1, wherein the circuitry is configured to:

control the industrial device to download data to be used in the next job as the preparation for the next location; and control the industrial device to perform the next job when the industrial device arrives at the next location and downloading of the data is completed.

8. The production system according to claim 1, wherein the circuitry is configured to:

control the industrial device to mount a device to be used in the next job; and control the industrial device to perform the next job when the industrial device arrives at the next location and mounting of the device is completed.

9. The production system according to claim 1, wherein another industrial device is disposed at the next location, and the circuitry is configured to synchronize the industrial device with the another industrial device when the industrial device arrives at the next location.

10. The production system according to claim 9, wherein the circuitry is configured to control the industrial device to obtain, when the industrial device arrives at the next location, at least one of information on a state of the another industrial device, information on a state of a job object at the next location, or detected information of a peripheral device at the next location.

11. The production system according to claim 1, wherein another industrial device is disposed at the next location, and the circuitry is configured to control the another industrial device to prepare for a job to be performed before or after the next job before the industrial device arrives at the next location.

12. The production system according to claim 1, wherein another industrial device and a communication device for a wired communication are disposed in the next location, the circuitry is configured to control the industrial device to communicate using a wireless communication while the industrial device is moving towards the next location, and control the industrial device to communicate using the wired communication via the communication device when the industrial device arrives at the next location.

13. The production system according to claim 1, wherein the circuitry is configured to execute a setting of the next job based on at least one of a current position or a current orientation of the industrial device when the industrial device arrives at the next location.

14. The production system according to claim 1, wherein the industrial device includes an automatic guided vehicle and a robot performing the next job.

15. The production system according to claim 1, comprising:

an instruction device configured to be communicably connected to a scheduling device scheduling a production plan, and provide an instruction of each job based on the schedule; and a transmitter configured to transmit a predetermined job completion notice to the instruction device when a current job of the industrial device is completed, wherein the instruction device is configured to receive the predetermined job completion notice;

the instruction device is configured to instruct the industrial device to move to the next location when the job completion notice is received, and the circuitry is configured to control the industrial device to prepare for the next job when a movement to the next location is instructed by the instruction device.

16. The production system according to claim 1, wherein the job program indicates a procedure from a start to an end of the next job in time series.

17. The production system according to claim 1, wherein the circuitry is configured to control the industrial device to download the job program and the parameter of the next job after the industrial device starts to move towards the next location.

18. The production system according to claim 17, further comprising an instruction device configured to transmit the movement instruction to the industrial device, wherein the circuitry is configured to:

receive the movement instruction from the instruction device, generate a movement path to the next location based on the movement instruction, and control the industrial device to move towards the next location based on the movement path.

19. A non-transitory information storage medium having stored thereon a program that causes a computer to:

control the industrial device to start to move towards a next location when the industrial device receives a movement instruction, control an industrial device being self-movable to download a job program and a parameter of a next job while the industrial device is moving towards the next location; and control the industrial device to perform the next job based on the job program and the parameter when the industrial device arrives at the next location and downloading the job program and the parameter is completed.

* * * * *